(12) United States Patent
Kang et al.

(10) Patent No.: US 9,103,974 B2
(45) Date of Patent: Aug. 11, 2015

(54) SEMICONDUCTOR DEVICES HAVING OPTICAL TRANSCEIVER

(75) Inventors: Pil-Kyu Kang, Anyang-si (KR); Dae-Lok Bae, Seoul (KR); Byung-Lyul Park, Seoul (KR); Gil-Heyun Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 660 days.

(21) Appl. No.: 13/412,210

(22) Filed: Mar. 5, 2012

(65) Prior Publication Data

US 2012/0314991 A1 Dec. 13, 2012

(30) Foreign Application Priority Data

Jun. 13, 2011 (KR) .................. 10-2011-0056949

(51) Int. Cl.

| G02B 6/12 | (2006.01) |
|---|---|
| G02B 6/34 | (2006.01) |
| G02B 6/124 | (2006.01) |
| G02B 6/42 | (2006.01) |
| G02B 6/43 | (2006.01) |
| G02B 6/136 | (2006.01) |

(52) U.S. Cl.
CPC ............. *G02B 6/124* (2013.01); *G02B 6/136* (2013.01); *G02B 6/4206* (2013.01); *G02B 6/43* (2013.01)

(58) Field of Classification Search
None
See application file for complete search history.

(56) References Cited

U.S. PATENT DOCUMENTS

| 6,897,498 B2 | 5/2005 | Gothoskar et al. |
|---|---|---|
| 7,245,803 B2 | 7/2007 | Gunn, III et al. |
| 7,881,574 B2 | 2/2011 | Pyo et al. |
| 2004/0156590 A1 | 8/2004 | Gunn, III et al. |
| 2004/0188794 A1 | 9/2004 | Gothoskar et al. |
| 2004/0247248 A1* | 12/2004 | Fasham .......................... 385/52 |
| 2010/0150500 A1 | 6/2010 | Pyo et al. |
| 2010/0202738 A1* | 8/2010 | Kopp .............................. 385/90 |
| 2011/0133063 A1 | 6/2011 | Ji et al. |
| 2011/0194803 A1 | 8/2011 | Shin et al. |
| 2011/0243492 A1 | 10/2011 | Na et al. |
| 2011/0250738 A1 | 10/2011 | Kang et al. |
| 2012/0039564 A1 | 2/2012 | Kang et al. |

FOREIGN PATENT DOCUMENTS

| KR | 10-0394019 B1 | 4/2003 |
|---|---|---|
| KR | 2006-0026847 A | 3/2006 |
| KR | 2010-0067347 A | 6/2010 |
| KR | 2011-0062393 A | 6/2011 |
| KR | 2011-0092043 A | 8/2011 |
| KR | 2011-0112126 A | 10/2011 |
| KR | 2011-0113462 A | 10/2011 |
| KR | 2012-0015929 A | 2/2012 |

* cited by examiner

*Primary Examiner* — Uyen Chau N Le
*Assistant Examiner* — John M Bedtelyon
(74) *Attorney, Agent, or Firm* — Harness, Dickey & Pierce, P.L.C.

(57) ABSTRACT

Semiconductor devices having an optical transceiver include a cladding on a substrate, a protrusion vertically extending trough the cladding and materially in continuity with the substrate, and a coupler on the cladding and the protrusion.

13 Claims, 20 Drawing Sheets

SEMICONDUCTOR DEVICES HAVING OPTICAL TRANSCEIVER

CROSS-REFERENCE TO RELATED APPLICATION

This application claims priority under 35 U.S.C. §119 to Korean Patent Application No. 10-2011-0056949 filed on Jun. 13, 2011, the disclosure of which is hereby incorporated herein by reference in its entirety.

BACKGROUND

1. Field

Example embodiments relate to semiconductor devices having an optical transceiver.

2. Description of Related Art

A semiconductor device having an optical transceiver has been proposed and examined to increase communication speed.

In recent years, fabrication of semiconductor memory devices has involved forming optical integrated circuit (IC) devices and electrical IC devices. An optical IC device may receive optical signals from optical fibers disposed outside a semiconductor memory device using a coupler, convert the optical signals into electric signals, and supply current to an electrical IC device.

A coupler may include single-crystalline silicon. Formation of the coupler may include filling in a trench of a bulk silicon substrate with amorphous silicon (a-Si), and single-crystallizing the a-Si using a laser irradiation process. During the single crystallization process, the a-Si may be single-crystallized by a distance of less than about 10 μm using the bulk silicon substrate as single-crystallization seeds. However, single-crystallizing the a-Si by a distance of about 10 μm or more is very difficult.

Although a wide coupler is required to collect a large amount of light, a method may be needed to manufacture a coupler with a total width of more than about 20 μm due to the distance limit (i.e., 10 μm) of a single crystallization reaction.

SUMMARY

Example embodiments relate to semiconductor devices having an optical transceiver.

Example embodiments provide optical transceivers.

Other example embodiments provide methods of manufacturing an optical transceiver.

Other example embodiments provide a module and an electronic system including the optical transceivers.

Aspects of the example embodiments should not be limited by the following description, and other unmentioned aspects will be clearly understood by one of ordinary skill in the art from example embodiments described herein.

In accordance with example embodiments, a semiconductor device includes a cladding on a substrate, a protrusion vertically extending through (or, penetrating) the cladding, and materially in continuity with the substrate, and a coupler on the cladding and the protrusion.

The substrate and the protrusion may include single crystalline silicon (Si).

The coupler may include single crystalline Si and be materially in continuity with the protrusion.

The semiconductor device may further include a waveguide materially in continuity with the coupler and having a vertical height equal to a vertical height of the coupler. The waveguide may be spaced apart from (or, not in contact with) the protrusion. The waveguide may have a smaller horizontal width than the coupler. The waveguide may be on the cladding.

The coupler may include a plurality of gratings. A height of the coupler may include a height of the plurality of gratings.

The semiconductor device may include a plurality of claddings. The coupler may be on at least two of the plurality of claddings.

The substrate may include a groove. A bottom (or, lower) surface of the groove may include a top (or, upper) surface of the cladding. The coupler may be within the groove. A depth of the groove may be equal to a vertical height of the coupler.

A minimum distance between a sidewall of the groove and the protrusion may range between 10 and 20 μm.

The cladding may include silicon oxide. The cladding may have a minimum horizontal width between 10 and 20 μm.

In accordance with example embodiments, a semiconductor device includes a substrate including single crystalline Si, a plurality of silicon oxide materials buried within the substrate, a single crystalline Si layer on the plurality of silicon oxide materials, and a protrusion between the plurality of silicon oxide materials and materially connected to the substrate and the single crystalline Si layer.

The semiconductor device may include a plurality of protrusions. The plurality of protrusions may be spaced apart from one another at intervals between 10 and 20 μm.

In accordance with example embodiments, a semiconductor device includes a plurality of protrusions protruding from a substrate so as to form at least one recess in the substrate, a cladding layer within the at least one recess of the substrate, and a coupler on at least one of the plurality of protrusions. The plurality of protrusions are integral with the substrate.

The semiconductor device may further include a single crystalline layer on the cladding layer. The single crystalline layer may be between two of the plurality of protrusions. The single crystalline layer may be integral with the substrate and the plurality of protrusions.

The single crystalline layer, the substrate and the plurality of protrusions may form a substrate pattern. An upper surface of the substrate pattern and an upper surface of the single crystalline layer may be at a same height.

The cladding layer may be completely within the recess. An upper surface of the plurality of protrusions and an upper surface of the cladding layer may be at a same height.

BRIEF DESCRIPTION OF THE DRAWINGS

Example embodiments will be more clearly understood from the following detailed description taken in conjunction with the accompanying drawings. FIGS. 1-10 represent non-limiting, example embodiments as described herein.

FIG. 1 is a perspective view of an optical transceiver of a semiconductor device according to example embodiments;

FIGS. 3A through 7E are schematic views illustrating various methods of manufacturing optical transceivers according to example embodiments;

FIG. 8 is a conceptual block diagram of a semiconductor device according to example embodiments;

FIG. 9 is a block diagram of a semiconductor module according to example embodiments; and FIG. 10 is a block diagram of an electronic system according to example embodiments.

DETAILED DESCRIPTION OF THE EMBODIMENTS

Figure 1:
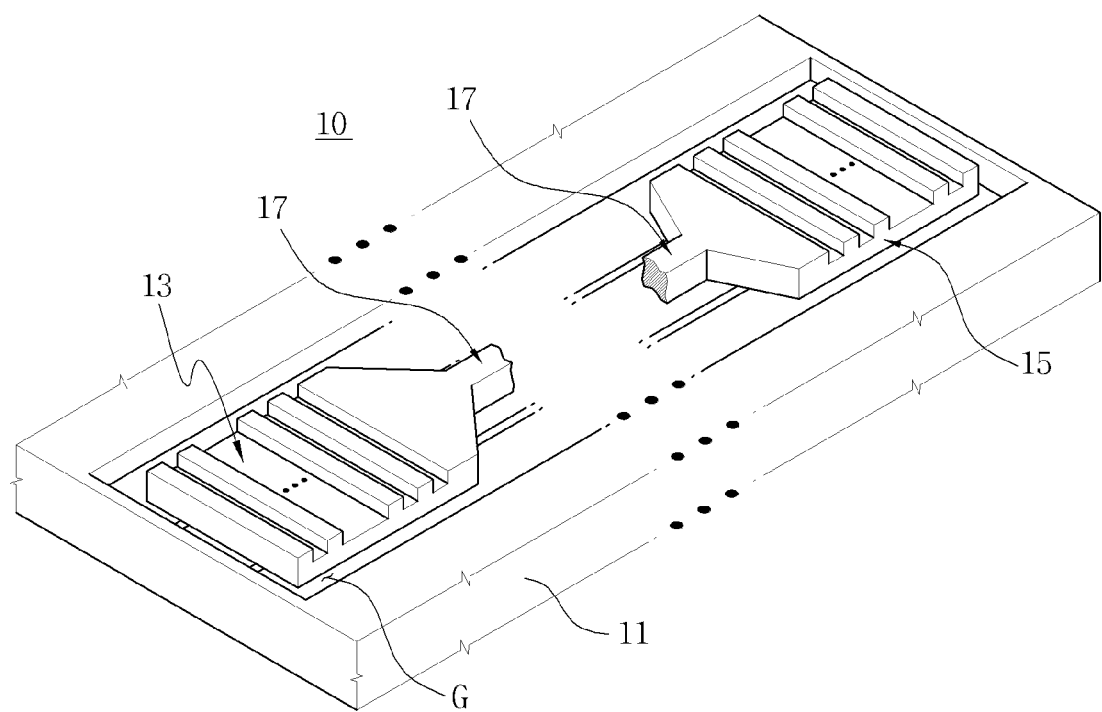

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In order to more specifically describe example embodiments, various aspects will be described in detail with reference to the attached drawings. However, the present invention is not limited to example embodiments described.

Example embodiments relate to semiconductor devices having an optical transceiver.

FIG. 1 is a schematic perspective view of an optical transceiver of a semiconductor device according to example embodiments.

Referring to FIG. 1, an optical transceiver 10 may include a groove G disposed on a substrate 11, and a first coupler 13, a second coupler 15 and an optical waveguide 17 which may be disposed within the groove G.

The optical transceiver 10 may include a component configured to receive an optical signal and convert the optical signal into an electric signal, or receive an electric signal and convert the electric signal into an optical signal. For example, the optical transceiver 10 may further include a photodetector, a photo-generator, a photoelectric converter, or an electro-photo converter.

Each of the first and second couplers 13 and 15 may collect or emit light. Each of the first and second couplers 13 and 15 may include a photodetector, a photo-generator, a photoelectric converter, or an electro-photo converter. However, the photodetector, photo-generator, photoelectric converter, or electro-photo converter is omitted for brevity.

The first and second couplers 13 and 15 may be optically connected to each other, or optically connected to other optical or electrical components, respectively. The substrate 11, the first coupler 13, the second coupler 15, and the waveguide 17 may be covered with a silicon oxide, although the silicon oxide is not shown for brevity.

FIGS. 2A through 2D are conceptual perspective views illustrating optical transceivers according to example embodiments.

Figure 2A:
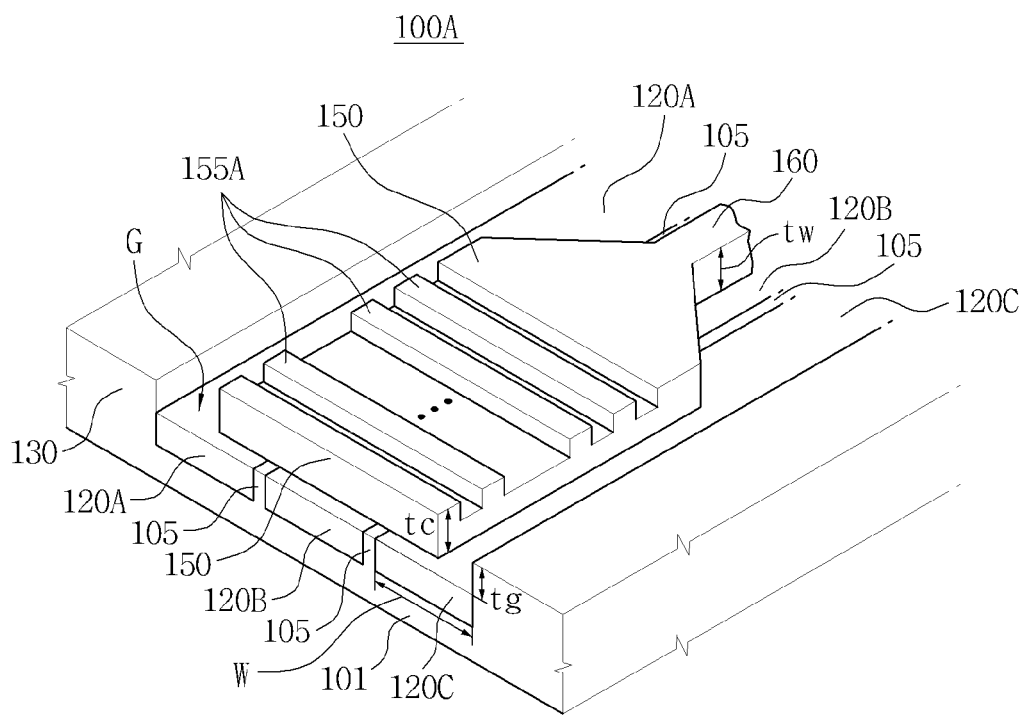
FIGS. 2A through 2D are conceptual perspective views of optical transceivers according to example embodiments.

Referring to FIG. 2A, an optical transceiver 100A according to example embodiments may include a groove G disposed on a substrate 101, and a coupler 150 and a waveguide 160 disposed within the groove G.

The substrate 101 may include single crystalline silicon (Si). For example, the substrate 101 may be a bulk wafer including a single crystalline Si. The coupler 150 and the waveguide 160 may include single crystalline Si. Claddings 120A, 120B, and 120C may include silicon oxide.

The groove G may include a region recessed from a top surface of the substrate 101. Alternatively, the groove G may be interpreted as an elevated portion of the substrate 101 disposed adjacent to the coupler 150 and the waveguide 160.

The optical transceiver 100A may include a plurality of claddings 120A, 120B, and 120C formed within the substrate 11 and exposed by a bottom surface of the groove G. The plurality of claddings 120A, 120B, and 120C may be buried within the substrate 11 corresponding to the bottom surface of the groove G. The claddings 120A, 120B, and 120C may be formed within the groove G. In FIG. 2A, although three claddings 120A, 120B, and 120C are shown formed within the groove G, example embodiments are not limited thereto. For instance, more than three claddings may be provided. Accordingly, at least one cladding or a larger number of claddings 120A, 120B, and 120C may be formed within the groove G. Each of the claddings 120A to 120C may have a horizontal width W (e.g., a minimum horizontal width W) between 10 and 20 μm. The horizontal width W of each of the claddings 120A to 120C may be significantly related with a single crystallization process and have an important meaning that will be described later.

The optical transceiver 100A may include protrusions 105 formed between the claddings 120A to 120C. The protrusions 105 may be interpreted as portions of the substrate 101, which may protrude or extend between the claddings 120A to 120C. Alternatively, it may be understood that the claddings 120A to 120C are regarded as a single component and vertically penetrated by the protrusions 105. Alternatively, it may be understood that trenches are formed within the substrate 101, and the claddings 120A to 120C are formed within, or to fill in, the trenches corresponding to the bottom surface of the groove G. The protrusions 105 may be rail shaped, or shaped in two straight lines parallel to each other. In example embodiments, the protrusions 105 may be bar, island, or pillar shaped.

The bottom surface of the groove G may include surfaces of the claddings 120A to 120C, and surfaces of the protrusions 105. Alternatively, it may be understood that the surfaces of the claddings 120A to 120C and the surfaces of the protrusions 105 may form the bottom surface of the groove G. These descriptions may be understood with further reference to the other appended drawings.

In example embodiments, the claddings 120A to 120C may be buried within the substrate 11. Alternatively, the claddings 120A to 120C may be disposed on the substrate 11, and the protrusions 105 of the substrate 11 may be interposed between the claddings 120A to 120C. In example embodiments, the claddings 120A to 120C may be integrally formed. The claddings 120A to 120C may be materially in continuity with one another over a wide area. In other example embodiments, a plurality of protrusions 105 may vertically penetrate (or, extend through) the claddings 120A to 120C. The above-described example embodiments will be explained in further detail with reference to the appended drawings.

Although it is illustrated that the claddings 120A to 120C have tetragonal sectional shapes, example embodiments are not limited thereto and the claddings 120A to 120C may have other shapes. For example, the claddings 120A to 120C may have circular, elliptical, or polygonal sectional shapes. However, the claddings 120A to 120C and the protrusions 105 may have planar surfaces.

The coupler 150 may be disposed on at least two of the plurality of claddings 120A to 120C within the groove G. Accordingly, the coupler 150 may be in contact with at least one protrusion 105. In the drawings, it is exemplarily illustrated that the coupler 150 is disposed on the three claddings 120A to 120C and in contact with two protrusions 105. The coupler 150 may include single crystalline Si. The coupler 150 may be physically and/or directly connected to the bottom surface of the groove G and spaced apart from sidewalls of the groove G.

Gratings 155A may be formed on the coupler 150. The gratings 155A may have a plurality of line shapes (or protrusions) parallel to one another. For example, the gratings 155A may be formed to resemble a wash board. The gratings 155A may have various horizontal widths. Top surfaces of the gratings 155A may be at substantially the same level. That is, the coupler 150 including the gratings 155A may have a uniform vertical height tc. The vertical height tc of the coupler 150 may be substantially equal to a depth tg of the groove G. The coupler 150 and the protrusions 105 may be integrally formed. In other words, the coupler 150 and the protrusions 105 may be materially in continuity with each other. Thus, an interface between the coupler 150 and the protrusions 105 may be invisible. In the drawings, it is assumed for brevity that respective components are discrete.

The waveguide 160 may be optically and/or materially connected to the coupler 150. The waveguide 160 may extend from a portion of the coupler 150. The waveguide 160 may have a smaller horizontal width than the coupler 150. The waveguide 160 may not be in contact with the protrusion 105. For instance, the waveguide 160 may be disposed on any one of the claddings 120A to 120C. Although it is illustrated that the waveguide 160 is disposed on the cladding 120B disposed in the center, the waveguide 160 may be disposed on the claddings 120A and 120C disposed on both sides. In this case, the waveguide 160 may have a smaller horizontal width than the cladding 120B disposed thereunder. Top surfaces of the waveguide 160 and the coupler 150 may be at substantially the same level. That is, the vertical height tc of the coupler 150 may be substantially equal to a vertical height tw of the waveguide 160. Accordingly, the depth tg of the groove G, the vertical height tc of the coupler 150, and the vertical height tw of the waveguide 160 may be substantially the same.

Figure 2B:
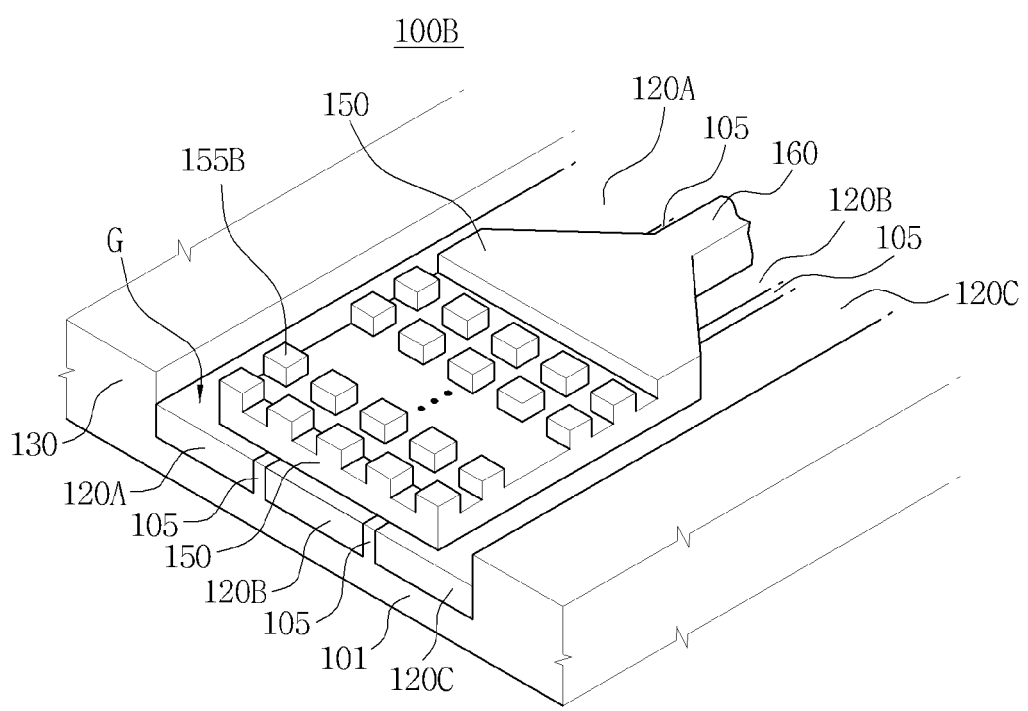

Referring to FIG. 2B, in an optical transceiver 100B according to other example embodiments, gratings 155B may be arranged as island types.

Figure 2C:
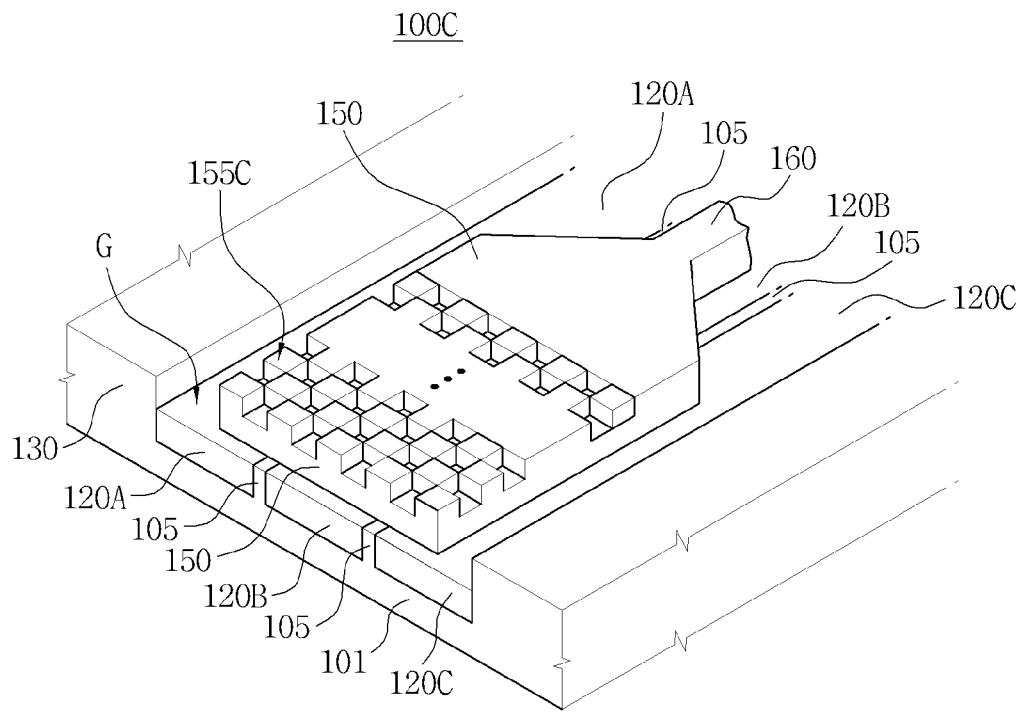

Referring to FIG. 2C, in an optical transceiver 100C according to still other example embodiments, gratings 155C may be arranged as reverse-island types.

Figure 2D:
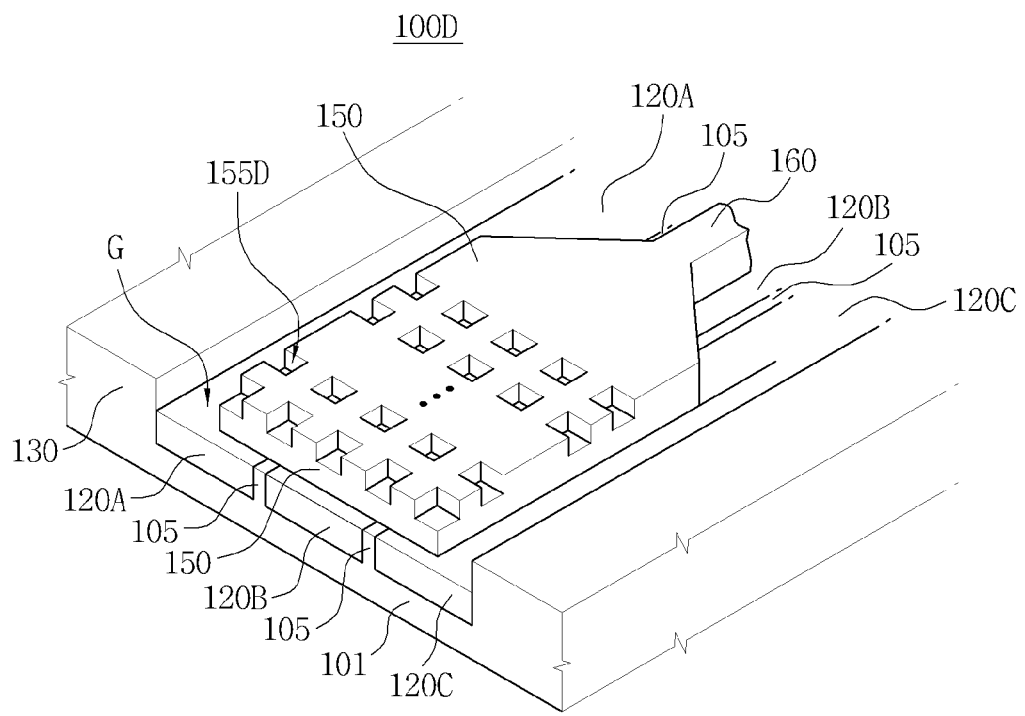

Referring to FIG. 2D, in an optical transceiver 100D according to further example embodiments, gratings 155D may be arranged as checker types. Although FIGS. 2B through 2D illustrate that the gratings 155B through 155D have mesa or regular hexahedron or cube shapes, lateral surfaces of the gratings 155B through 155D may have tapered shapes.

Referring to FIGS. 2A through 2D, the substrate 101 and the coupler 150 may be covered with another cladding material, for example, silicon oxide. However, the cladding material is omitted in FIGS. 2A through 2D for brevity.

Figure 3A:
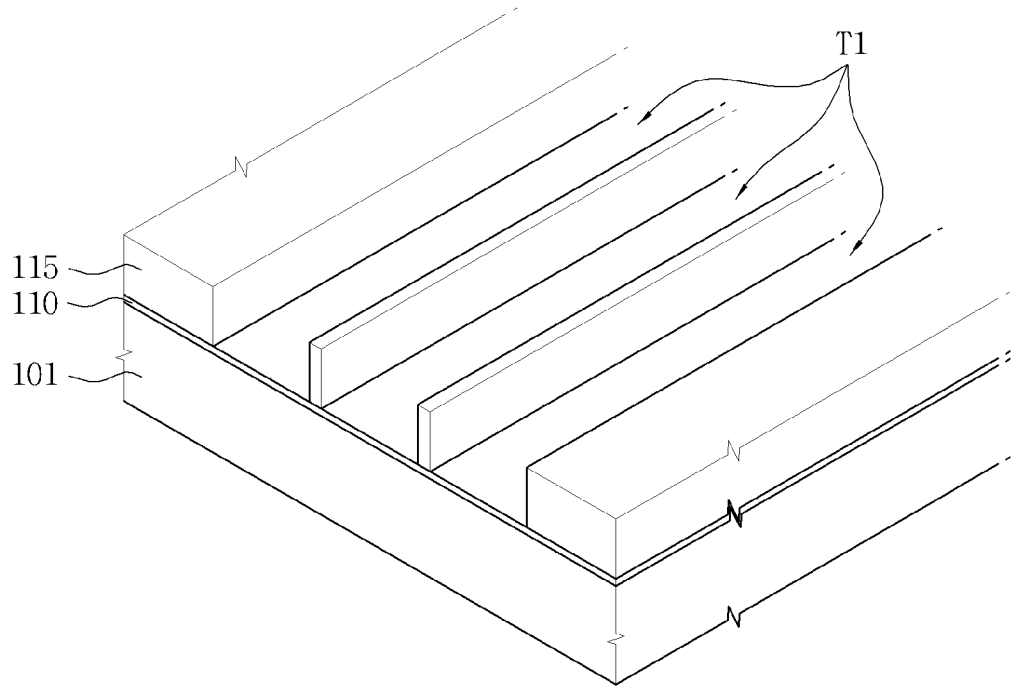
Figure 3B:
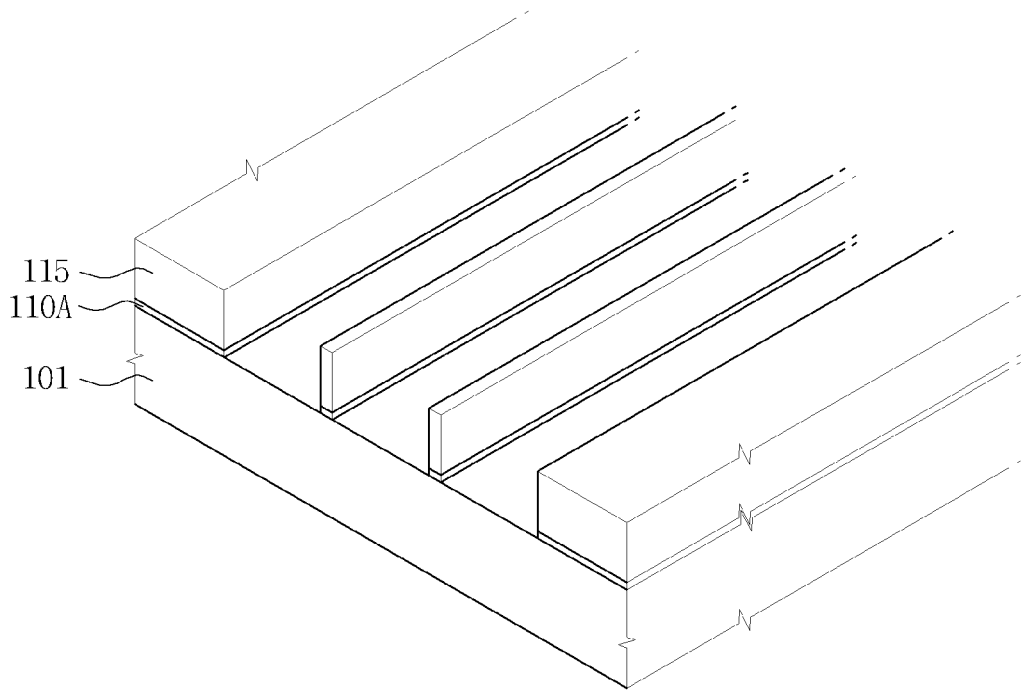
Figure 3C:
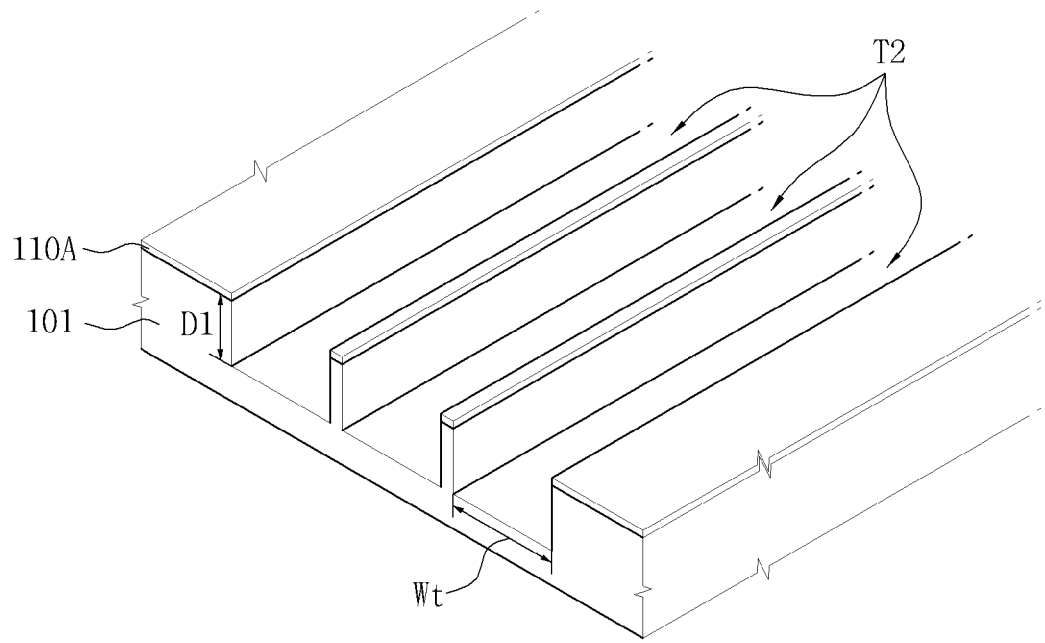
Figure 3D:
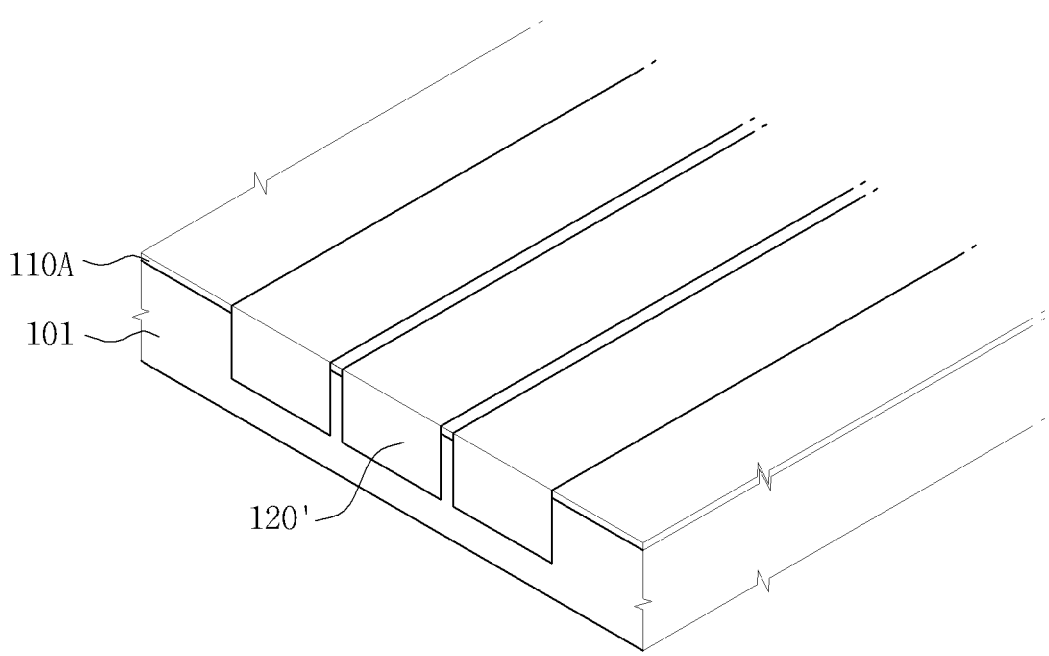
Figure 3E:
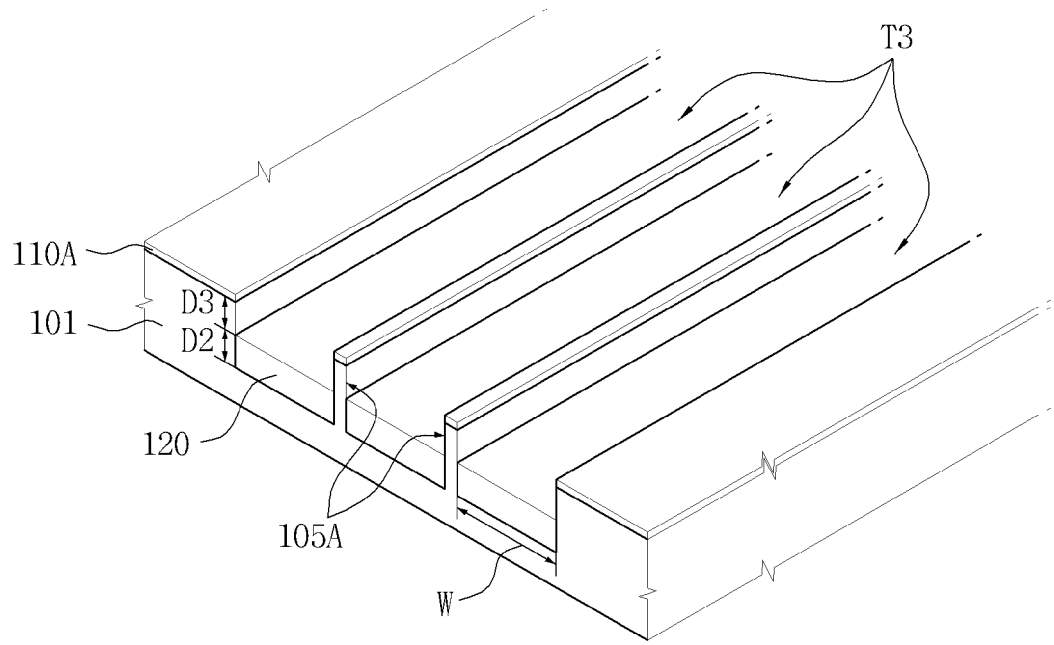
Figure 3F:
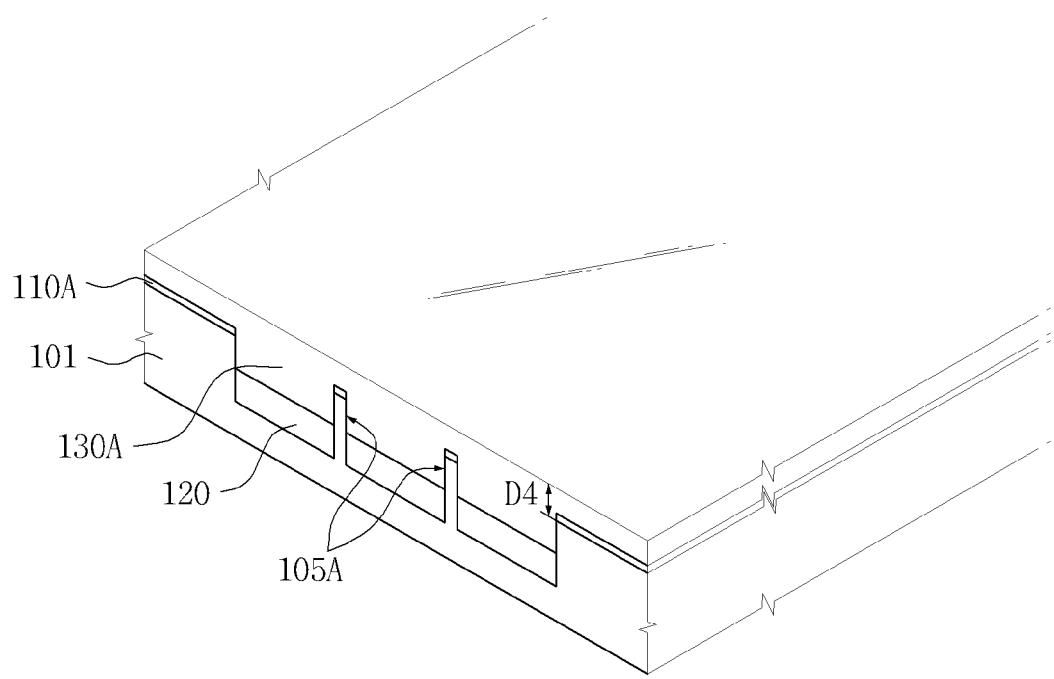
Figure 3G:
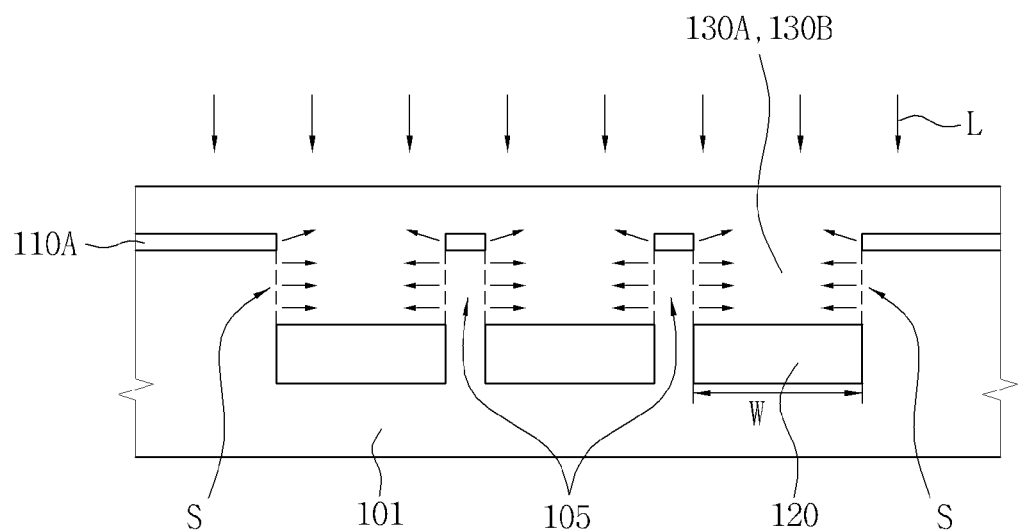
Figure 3H:
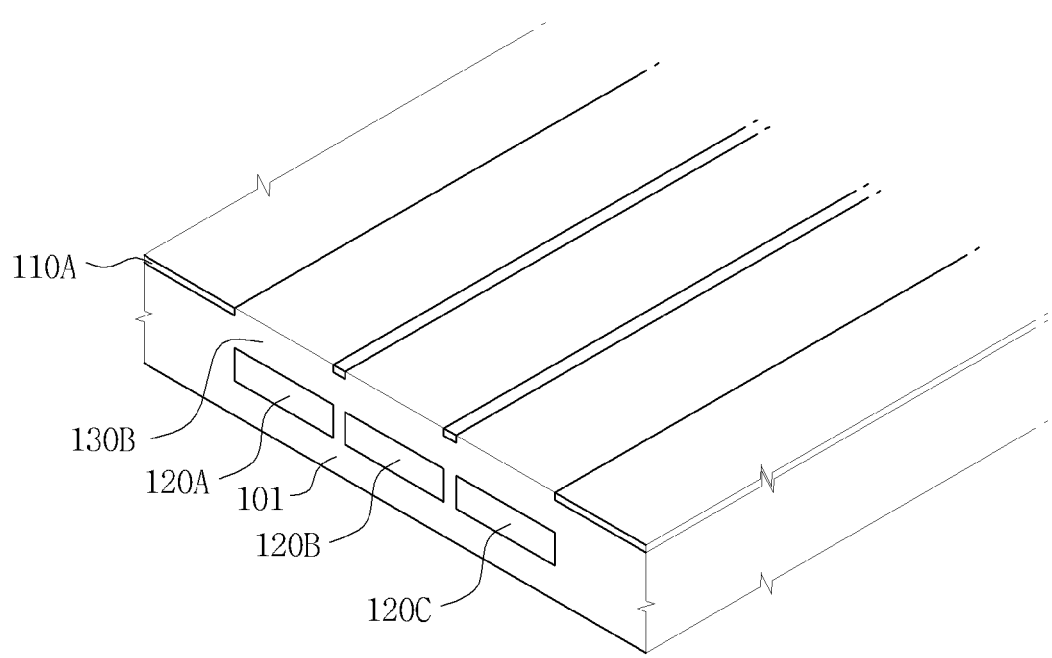
Figure 3I:
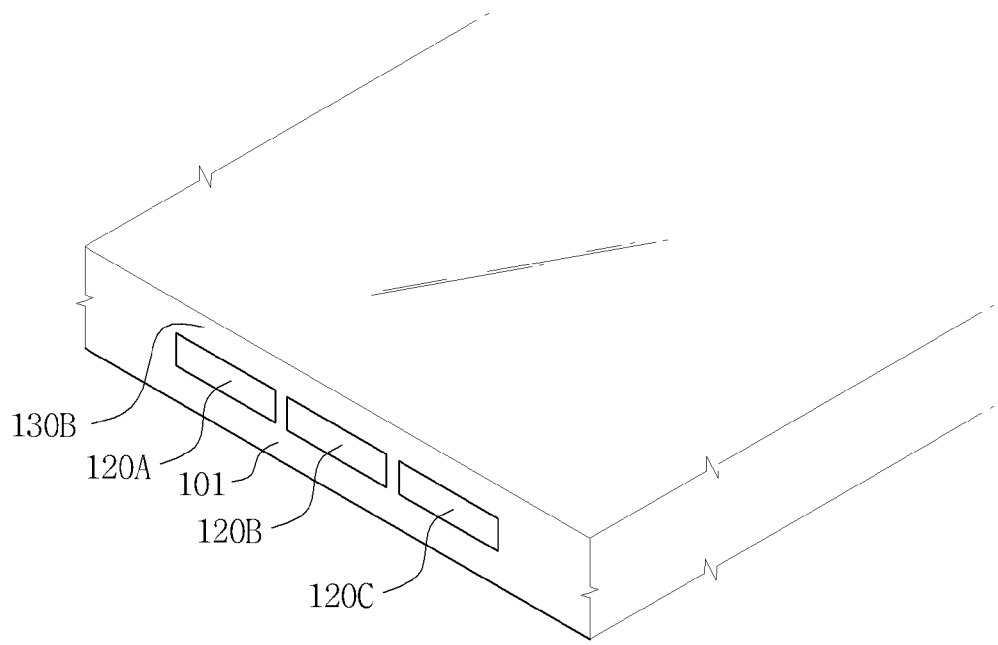
Figure 3J:
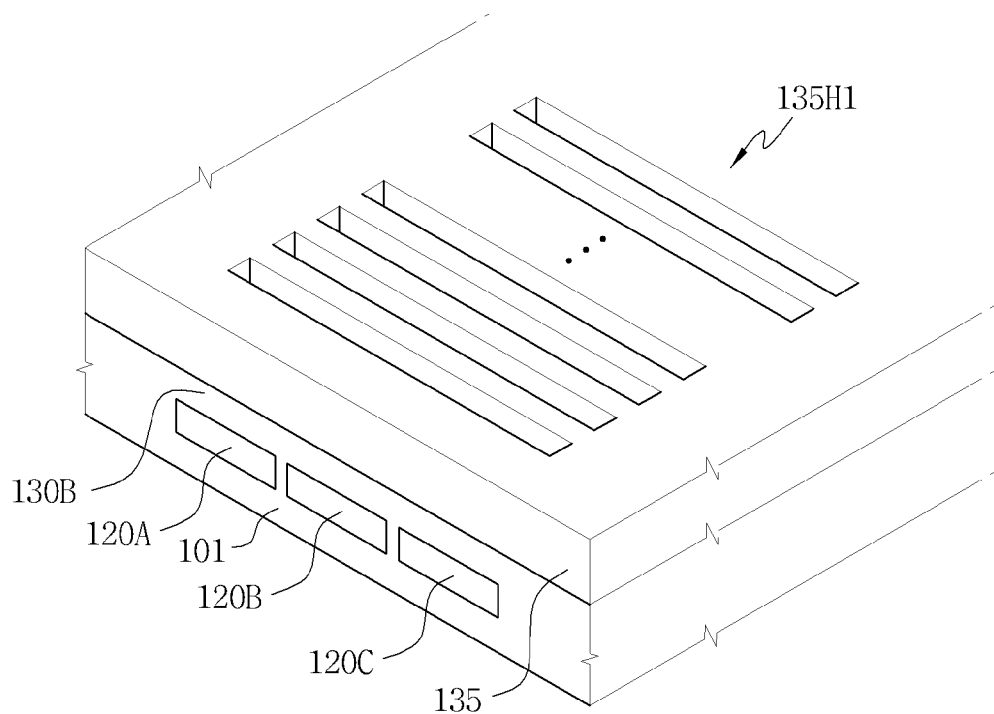
Figure 3K:
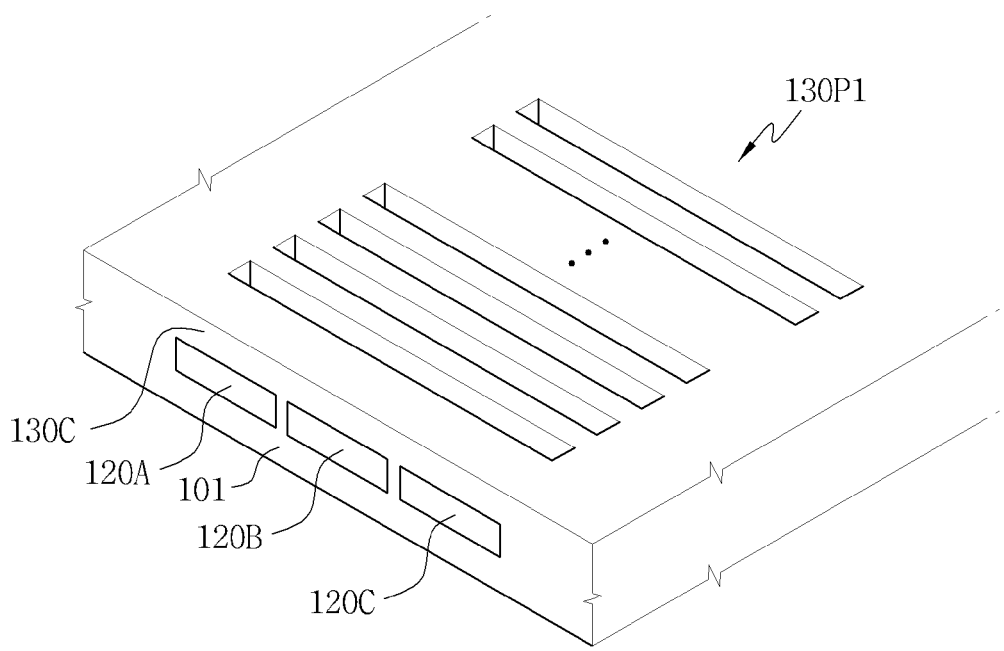
Figure 3L:
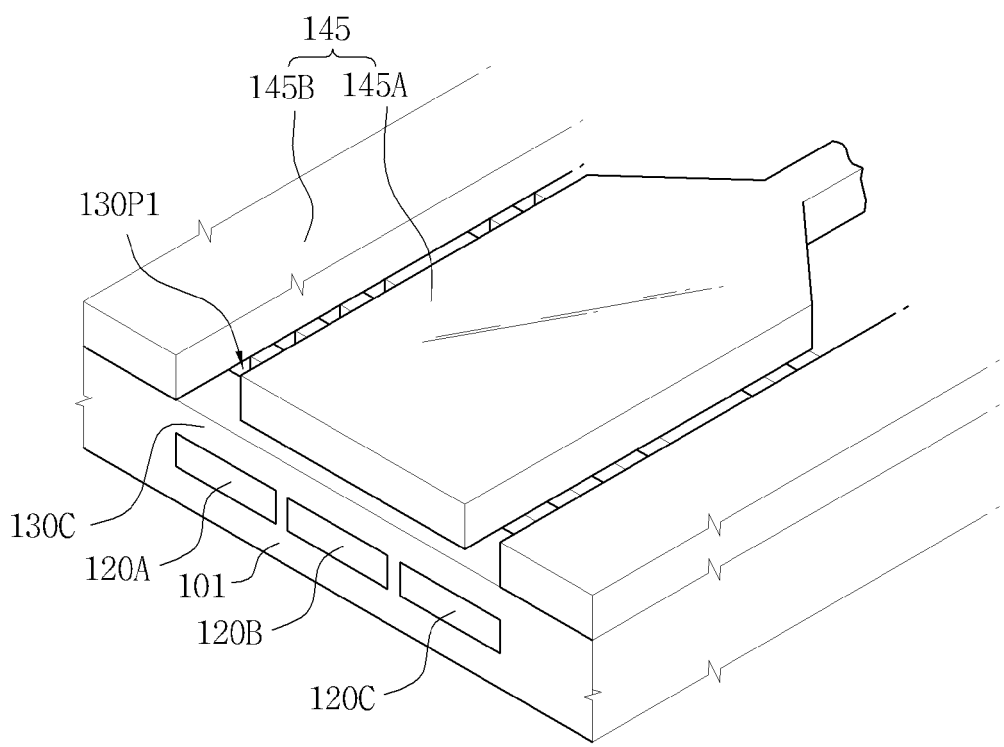
Figure 3M:
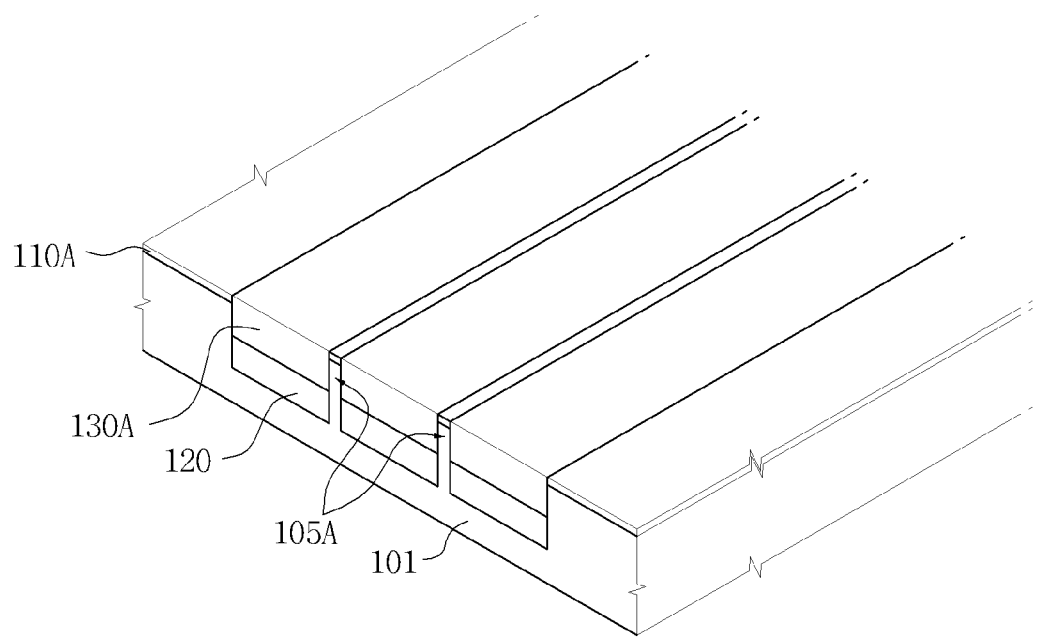
Figure 3N:
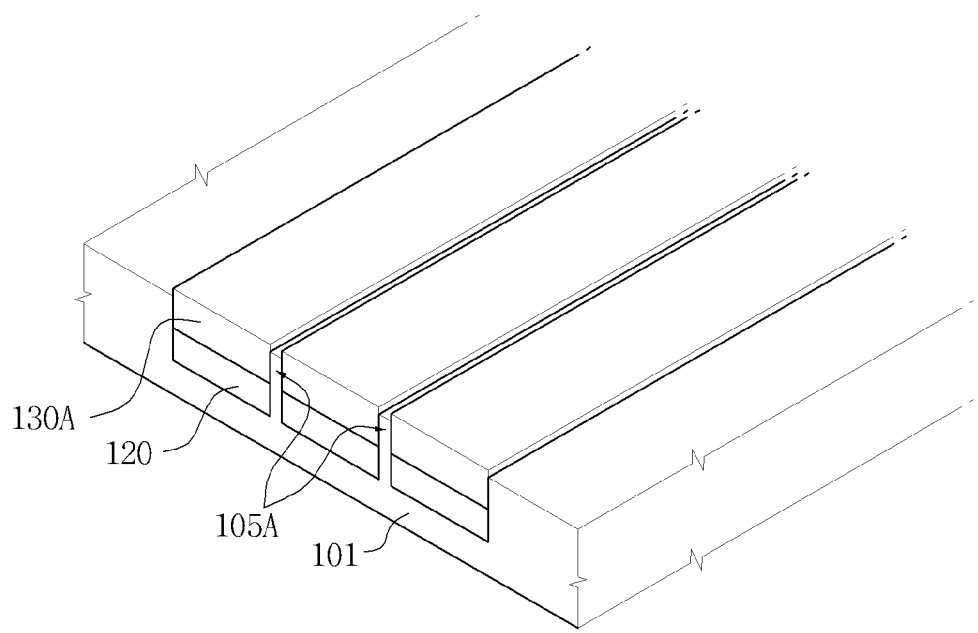

FIGS. 3A through 3N are schematic diagrams illustrating methods of forming optical transceivers according to example embodiments.

Although most of FIGS. 3A through 3N are perspective views, some diagrams thereof are provided as projected and cross-sectional views for clarity.

Referring to FIG. 3A, a pad element 110 and a first mask pattern 115 may be formed on a substrate 101. The pad element 110 may cover the entire surface of the substrate 101. The pad element 110 may include silicon nitride, silicon oxide, or a combination thereof. The first mask pattern 115 may define a first trench T1. The first mask pattern 115 may define a plurality of first trenches T1. In example embodiments, it is exemplarily illustrated that the first trench T1 includes three unit trenches. The first mask pattern 115 may include an organic material, for example, photoresist. However, the first mask pattern 115 may include an inorganic material having an etch selectivity with respect to the pad element 110.

Referring to FIG. 3B, a pad element pattern 110A may be formed to expose a surface of the substrate 101. The pad element pattern 110A may be formed by a first etching process using the first mask pattern 115 as a patterning mask. The first etching process may include removing the pad element 110, that is, silicon nitride and/or silicon oxide.

Referring to FIG. 3C, a plurality of second trenches T2 may be recessed within the substrate 101. The second trenches T2 may be formed by a second etching process using the first mask pattern 115, or the pad element 110A, as a patterning mask. Specifically, the second trenches T2 may be patterned using the first mask pattern 115 as a patterning mask. Alternatively, the first mask pattern 115 may be removed, and the second trenches T2 may be patterned using the exposed pad element 110A as a patterning mask. The second etching process may include removing silicon. In addition, the second trenches T2 may be recessed to a first depth D1 from a surface of the substrate 101. The second trenches T2 may have a horizontal width Wt between 10 and 20 µm.

Referring to FIG. 3D, the second trenches T2 may be filled with a cladding filler 120'. The formation of the cladding filler 120' may include forming a filling material to completely fill the second trenches T2 with the filling material and sufficiently cover a top (or, upper) surface of the substrate 101 with the filling material, and planarizing the filling material using, for example, a chemical mechanical polishing (CMP) process. That is, a top surface of the cladding filler 120' may be at the same, or about the same, level as a top surface of the pad element pattern 110A. The cladding filler 120' may include silicon oxide.

Referring to FIG. 3E, a cladding 120 may be formed by partially removing the surface of the cladding filler 120'. The cladding 120 may partially fill the second trenches T2. As a result, third trenches T3 may be formed. The first depth D1 of each of the second trenches T2 may be divided into a second depth D2 corresponding to a thickness of the cladding 120, and a third depth D3 corresponding to a depth of the third trench T3. The protrusions 105A may be exposed by sidewalls of the third trenches T3. Accordingly, the protrusions 105A may be portions of the substrate 101. The cladding 120 may have a horizontal width W between 10 and 20 µm as described above.

Referring to FIG. 3F, an amorphous material layer 130A may be formed to completely fill in the third trenches T3, and to sufficiently cover the top surface of the pad element pattern 110A. FIG. 3F illustrates that the amorphous material layer 130A is partially planarized. Specifically, the amorphous material layer 130A may be formed to a sufficient thickness on the top surface of the pad element pattern 110A, and partially planarized using a CMP or etch-back process. The amorphous material layer 130A may include amorphous silicon (a-Si) or polycrystalline silicon (poly-Si). The term "amorphous" may be interpreted to include the meaning of "polycrystalline." When the amorphous material layer 130A is partially planarized, a fourth distance D4 between the surface of the substrate 101 and a top surface of the amorphous material layer 130A may be about within 10 µm. The fourth distance D4 of about 10 µm may correspond to an effective distance by which the amorphous material layer 130A may be single-crystallized due to the single-crystallization reaction. Furthermore, by reducing the thickness of the amorphous material layer 130A, the transmission rate of laser beams may be increased to improve process efficiency.

Referring to FIG. 3G, the amorphous material layer 130A may be changed into a single crystalline material layer 130B using a single crystallization process. The single crystallization process may include a laser process, a thermal treatment process, a rapid thermal process (RTP), or an annealing process using a furnace. FIG. 3G exemplarily illustrates that the single crystallization process is performed by irradiating laser beams (L) to the amorphous material layer 130A. The single-crystallization process using the laser beams L may be performed more rapidly and provide a wider single-crystallization range than other processes. Due to the single-crystallization process, a single-crystallization reaction may occur in the direction of the small arrows using surfaces S of the protrusions 105 and the substrate 101 as single-crystallization seeds. For example, the single-crystallization reaction may occur due to a laser-induced lateral epitaxial growth (LEG) technique. It is known that a single crystallization reaction has a distance limit of about 10 µm. In other words, a single crystallization reaction using seeds may not proceed a distance of about 10 µm or more. Accordingly, in example embodiments, when the horizontal width W of the claddings 120 is controlled to about 20 µm or less, the amorphous material layer 130A filled within the third trenches T3 (i.e., the amorphous material layer 130A formed on the claddings 120) may be sufficiently changed into the single-crystalline material layer 130B. As a result, when each of the claddings 120 is spaced a distance of about 10 µm or less apart from the single-crystalline seeds disposed on either side thereof, the horizontal width W of the claddings 120 may be about 20 µm or less. In FIG. 3G, dotted lines denote boundary surfaces between the amorphous material layer 130A and the substrate 101, which may disappear during the transition from the amorphous material layer 130A to the single-crystalline material layer 130B. This will be understood more fully with reference to FIGS. 5A and 6E.

Referring to FIG. 3H, an upper portion of the single crystalline material layer 130B may be planarized. Specifically, a top surface of the single crystalline material layer 130B may be at the same level as, or at a lower level than, the pad element pattern 110A. When an upper region of the amorphous material layer 130A is not sufficiently single-crystallized due to the single crystallization process, regions that are not sufficiently single-crystallized may be removed using a planarization process.

Referring to FIG. 3I, the pad element pattern 110A may be removed, and the single-crystalline material layer 130B may be exposed. The single-crystalline material layer 130B may have a planar top surface. The pad element pattern 110A may be removed using various methods. For example, the pad element pattern 110A may be removed using a wet etching process. Alternatively, the pad element pattern 110A and a portion of the single crystalline material layer 130B may be simultaneously removed using a dry etching process. Alternatively, the pad element pattern 110A may be removed by sufficiently performing a CMP process. FIG. 3I illustrates only three claddings 120A, 120B, and 120C for brevity.

Referring to FIG. 3J, a second mask pattern 135 may be formed. The second mask pattern 135 may include a photoresist pattern, a silicon oxide pattern, and/or a silicon nitride pattern. In example embodiments, it is exemplarily illustrated that the second mask pattern 135 includes a photoresist pattern. The second mask pattern 135 may include mask holes 135H1. The mask holes 135H1 may be arranged as a plurality of lines parallel to one another.

Referring to FIG. 3K, a single-crystalline material pattern 130C may be formed. The single-crystalline material pattern 130C may be formed by a third etching process using the second mask pattern 135 as a patterning mask. The third etching process may include removing silicon. Afterwards, the second mask pattern 135 may be removed. As a result, the single crystalline material pattern 130C may include hole patterns 130P1 corresponding to the mask holes 135H1.

Referring to FIG. 3L, a third mask pattern 145 may be formed on the single-crystalline material pattern 130C. The third mask pattern 145 may include a photoresist pattern. The third mask pattern 145 may include an internal mask pattern 145A and an external mask pattern 145B. The hole patterns 130P1 of the single-crystalline material pattern 130C may be partially exposed in a space between the internal and external mask patterns 145A and 145B. Afterwards, a fourth etching process may be performed using the mask pattern 145 as a patterning mask, thereby forming the optical transceiver 100A of FIG. 2A. The fourth etching process may include removing silicon. The fourth etching process may include patterning the single-crystalline material pattern 130C to expose the top surface of the claddings 120A to 120C, and removing the third mask pattern 145. Thus, the groove G of FIG. 2A may be formed.

FIGS. 3M and 3N are diagrams illustrating processes of changing the amorphous material layer into the single-crystalline material layer according to example embodiments.

Referring to FIG. 3M, during the process described with reference to FIG. 3F, the amorphous material layer 130A may be planarized to expose the pad element pattern 110A. Afterwards, the single-crystallization process described with reference to FIG. 3G may be performed to obtain a shape shown in FIG. 3H.

Referring to FIG. 3N, before the single-crystallization process is performed, the pad element pattern 110A may be removed from the shape shown in FIG. 3M. Thereafter, the single-crystallization process described with reference to FIG. 3G may be performed, and a top surface of the resultant structure may be partially planarized to obtain a shape shown in FIG. 3I.

Figure 4A:
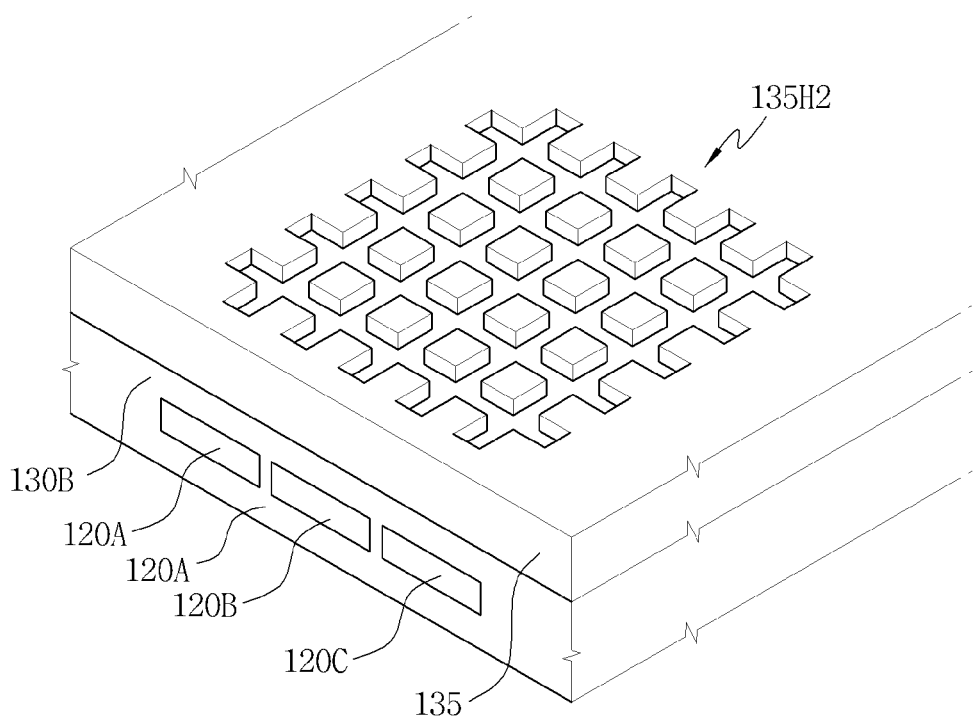
Figure 4B:
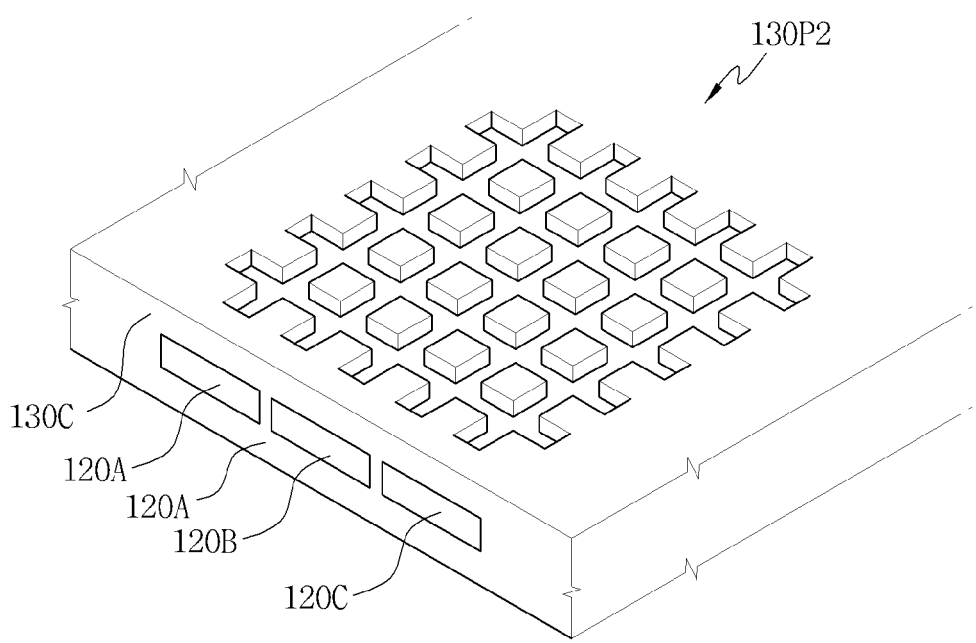

FIGS. 4A and 4B are schematic diagrams illustrating a method of manufacturing an optical transceiver according to example embodiments.

Referring to FIG. 4A, during the process described with reference to FIG. 3J, the second mask pattern 135 may include second mask holes 135H2. The second mask holes 135H2 may be arranged as island types. In example embodiments, the second mask holes 135H2 may be arranged as checker types or reverse-island types.

Referring to FIG. 4B, after the process described with reference to FIG. 4A, a single-crystalline material layer 130B may be formed using the second mask pattern 135 as a patterning mask. The above-mentioned third etching process may be performed. Afterwards, the second mask pattern 135 may be removed. The single-crystalline material layer 130B may include island patterns 130P2. After that, the process described with reference to FIG. 3L may be performed, thereby forming the optical transceiver 100B shown in FIG. 2B. Referring to FIGS. 3A through 4B, methods of manufacturing the optical transceivers 100C and 100D shown in FIGS. 2C and 2D may be fully understood.

FIGS. 5A through 5D are schematic diagrams illustrating a method of manufacturing an optical transceiver according to example embodiments.

Figure 5A:
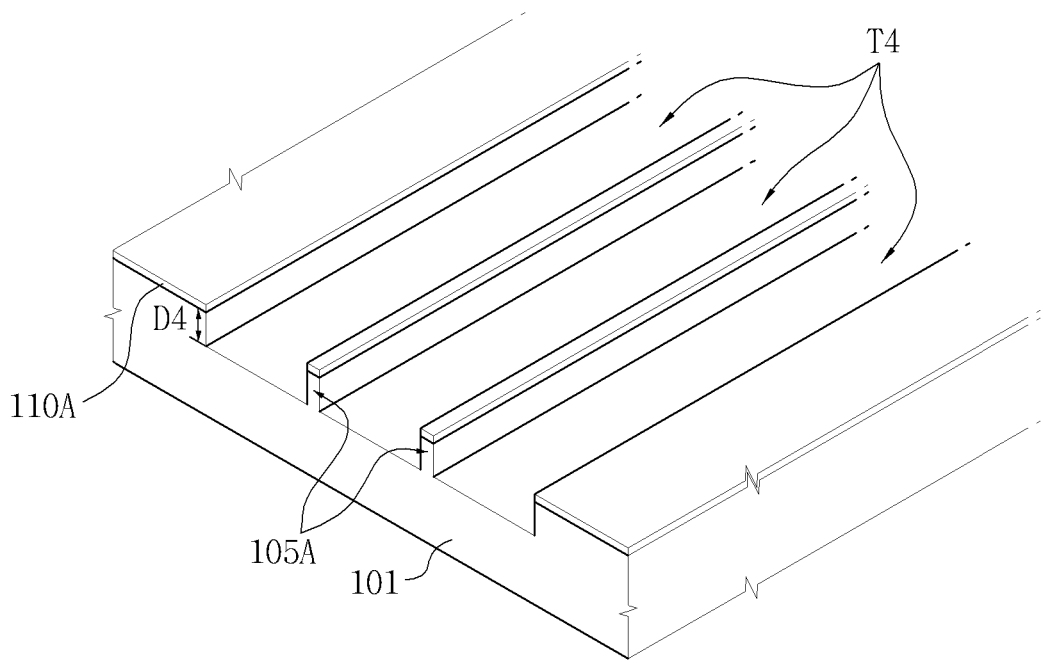

Referring to FIG. 5A, a pad element pattern 110A may be formed on a substrate 101, and fourth trenches T4 having a fourth depth D4 may be formed. The formation of the pad element pattern 110A and the fourth trenches T4 may be understood in further detail with reference to FIGS. 3A and 3B.

Figure 5B:
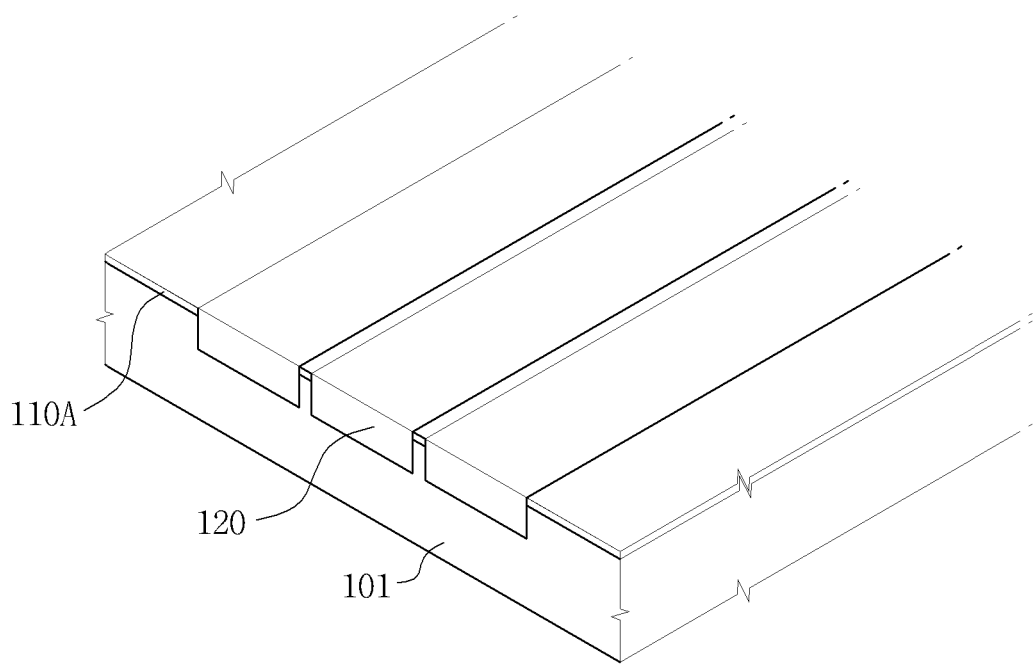

Referring to FIG. 5B, claddings 120 may be formed within the fourth trenches T4. Top surfaces of the claddings 120 may be planarized. The top surfaces of the claddings 120 may be at the same, or about the same, level as an upper surface of the pad element pattern 110A. Afterwards, the pad element pattern 110A may be removed.

Figure 5C:
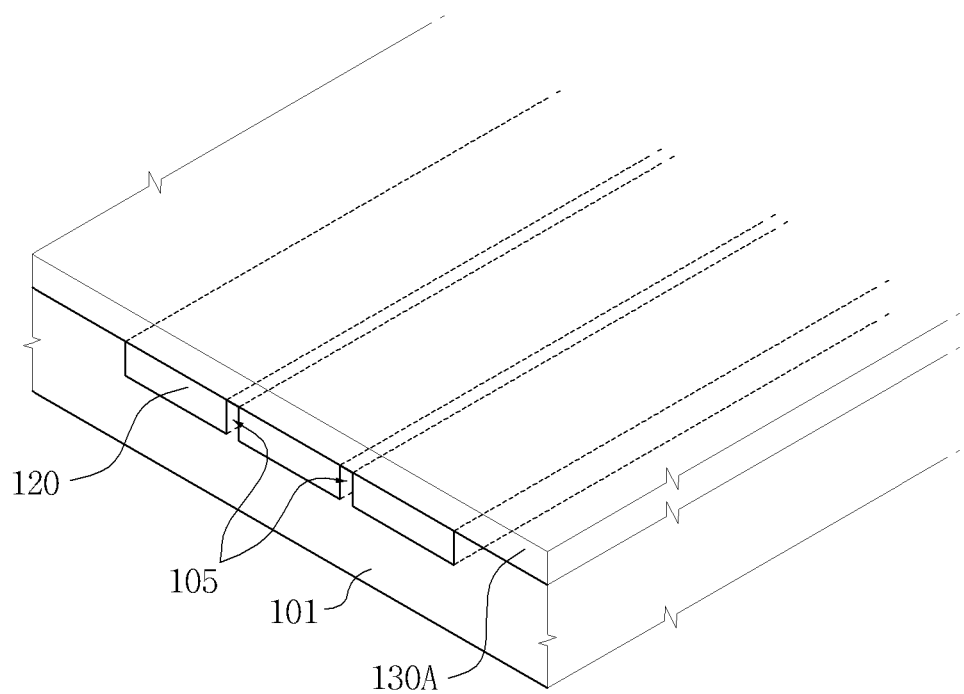

Referring to FIG. 5C, an amorphous material layer 130A may be formed on the claddings 120 and the pad element pattern 110A. In FIG. 5C, dotted lines denote interfaces between respective components disposed within the amorphous material layer 130A.

Figure 5D:
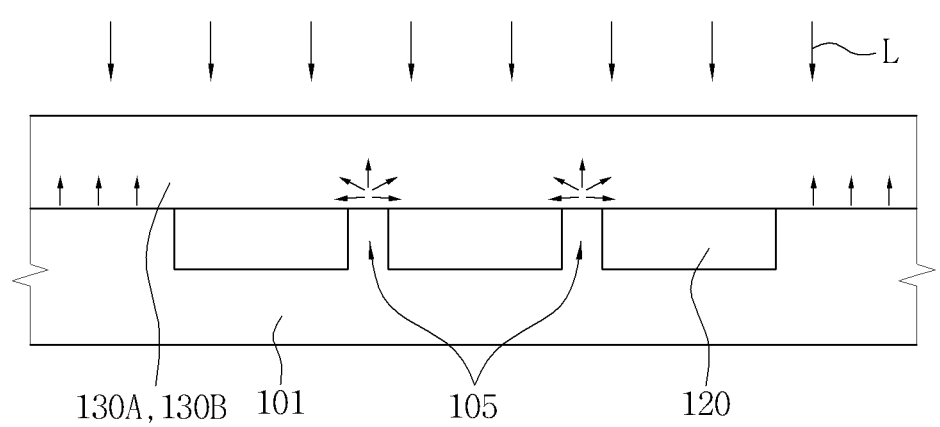

Referring to FIG. 5D, the amorphous material layer 130A may be changed into a single-crystalline material layer 130B using a single crystallization process. The single-crystallization process may be understood in further detail with reference to FIGS. 3G and 6E. Afterwards, a portion of the resultant structure may be planarized to obtain a shape shown in FIG. 3I. Subsequent processes may be understood with reference to 3J through 3N.

FIGS. 6A through 6E are schematic diagrams illustrating a method of manufacturing an optical transceiver according to example embodiments.

Figure 6A:
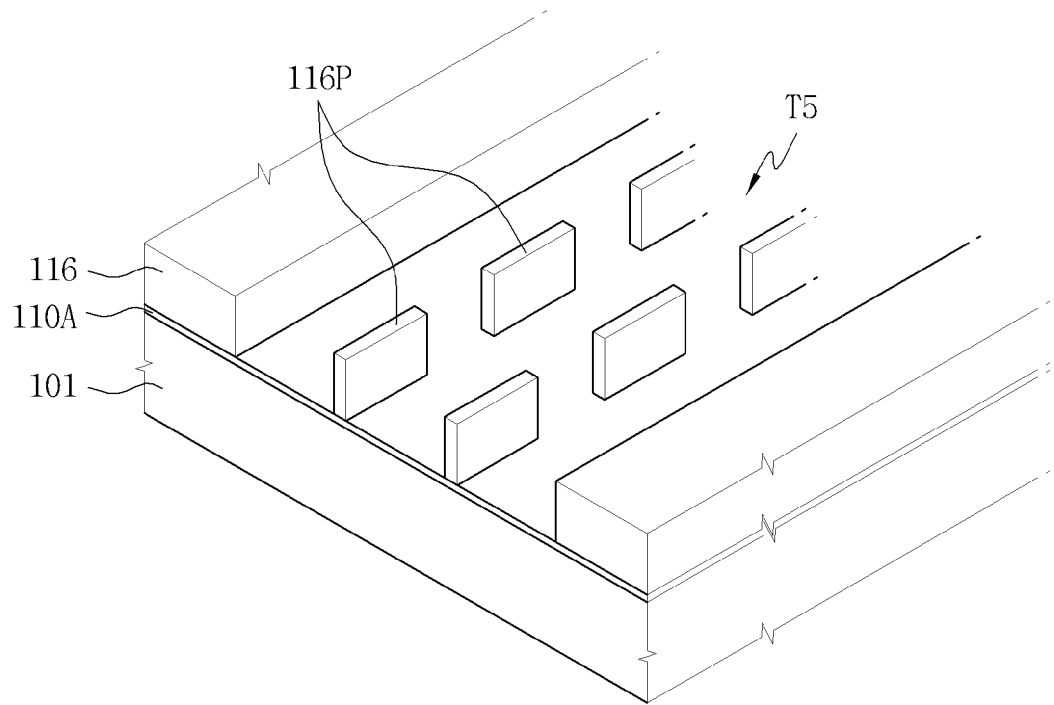

Referring to FIG. 6A, as compared with FIG. 3A, a mask pattern 116 including bar shapes 116P may be formed on a pad element 110. Fifth trenches T5 may be formed by the mask pattern 116. The mask pattern 116 may be understood with reference to the first mask pattern 115.

Figure 6B:
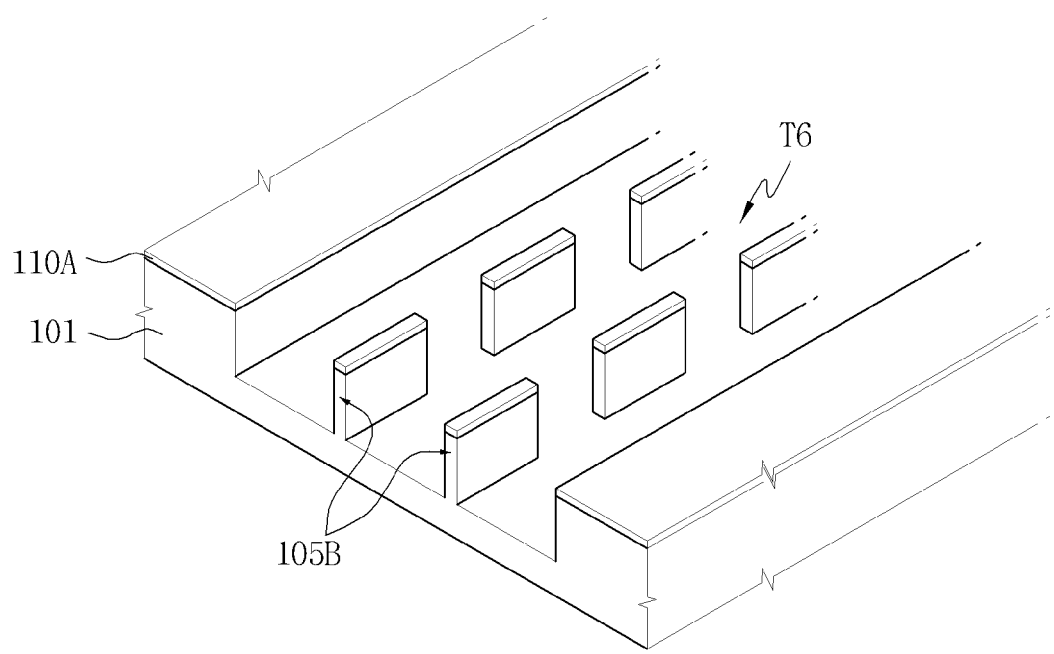

Referring to FIG. 6B, the pad element 110 may be patterned using the mask pattern 116 as a patterning mask, thereby forming a pad element pattern 110A. Afterwards, the substrate 101 may be selectively etched using the mask pattern 116 or the pad element pattern 110A as a patterning mask, thereby forming sixth trenches T6. Bar-shaped protrusions 105B may be formed under the pad element pattern 110A.

Figure 6C:
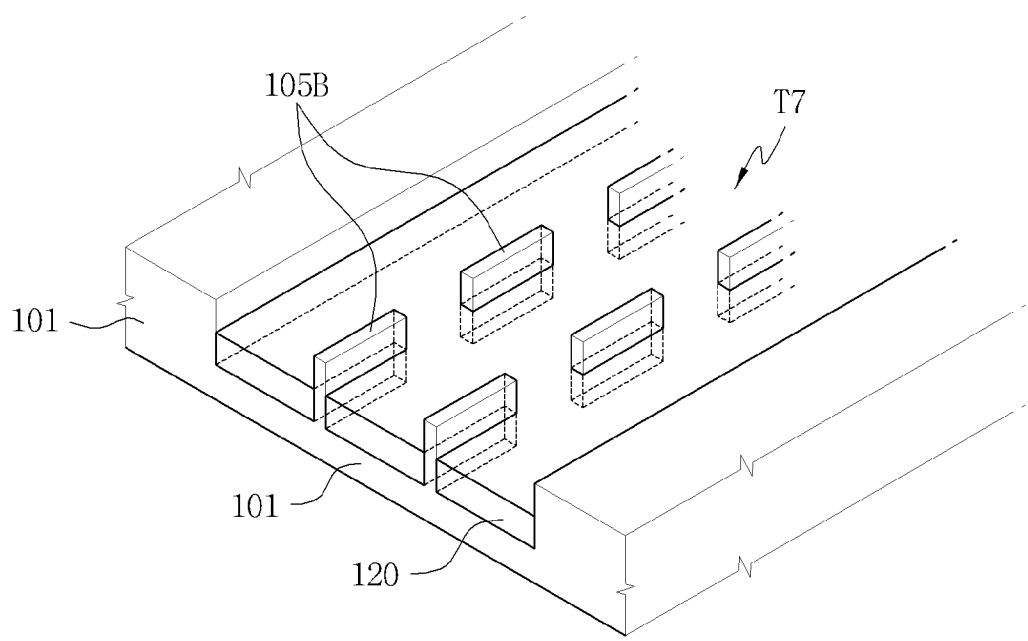

Referring to FIG. 6C, claddings 120 may be formed within the sixth trenches T6. Seventh trenches T7 may be formed on the claddings 120. Bar-shaped protrusions 105B may be exposed on the claddings 120, or within the seventh trenches T7. Although the pad element pattern 110A may not be removed, FIG. 6C illustrates that the pad element pattern 110A is removed to demonstrate that the example embodiments may be variously applied and embodied. In FIG. 6C, dotted lines denote outer lines or interfaces.

Figure 6D:
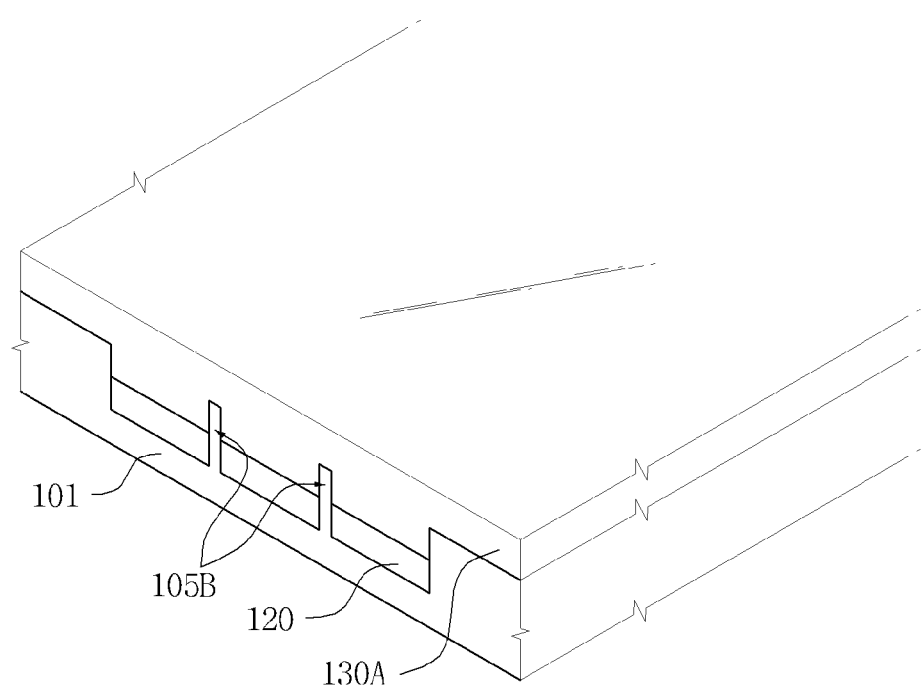

Referring to FIG. 6D, the seven trenches T7 may be filled with an amorphous material layer 130A. The amorphous material layer 130A may be formed on the substrate 101 to a sufficient thickness. In FIG. 6D, an upper portion of the amorphous material layer 130A is partially planarized.

Figure 6E:
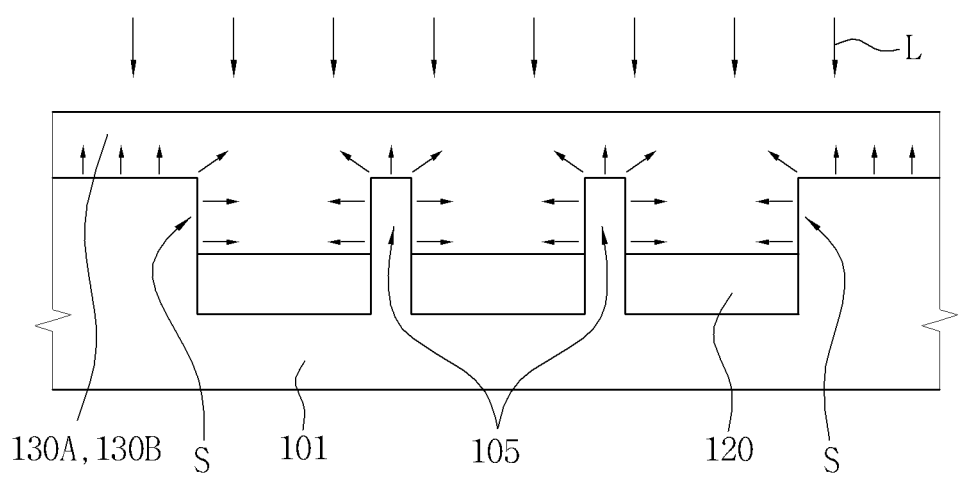

Referring to FIG. 6E, a single crystallization process may be performed using surfaces S of the bar-shaped protrusions 105B and the substrate 101 as single-crystallization seeds so that the amorphous material layer 130A can be changed into a single-crystalline material layer 130B. The single crystallization process of FIG. 6E may be understood in further detail with reference to FIGS. 3G and 5D. Thereafter, a planarization process may be further performed to obtain a shape shown in FIG. 3I.

FIGS. 7A through 7E are schematic diagrams illustrating a method of manufacturing an optical transceiver according to example embodiments.

Figure 7A:
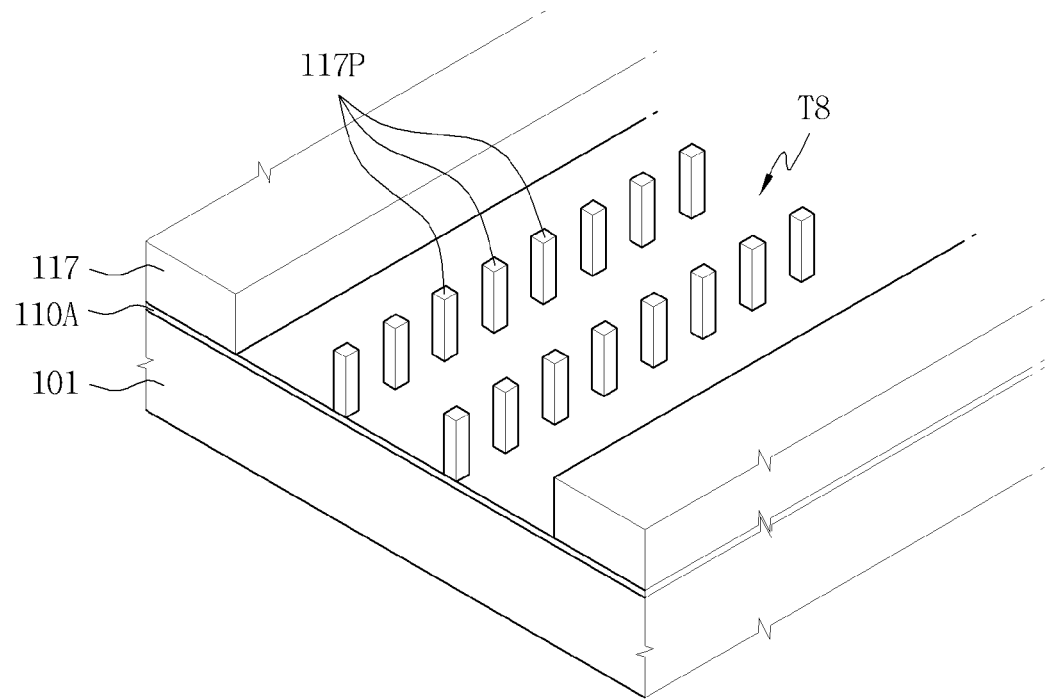

Referring to FIG. 7A, a mask pattern 117 having island or pillar shapes 117P may be formed on a pad element 110. Eighth trenches T8 may be formed by the mask pattern 117.

Figure 7B:
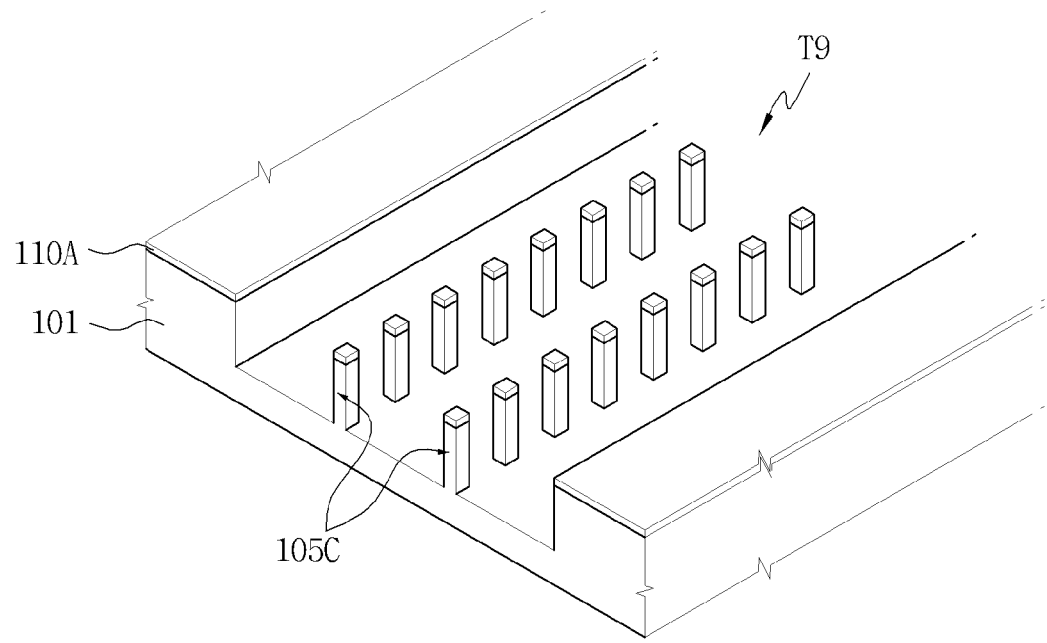

Referring to FIG. 7B, the pad element 110 may be patterned using the mask pattern 117 as a patterning mask, thereby forming a pad element pattern 110A. After that, a substrate 101 may be selectively etched using the mask pattern 116 or the pad element pattern 110A as a patterning mask, thereby forming ninth trenches T9. Island- or pillar-shaped protrusions 105C may be formed under the pad element pattern 110A.

Figure 7C:
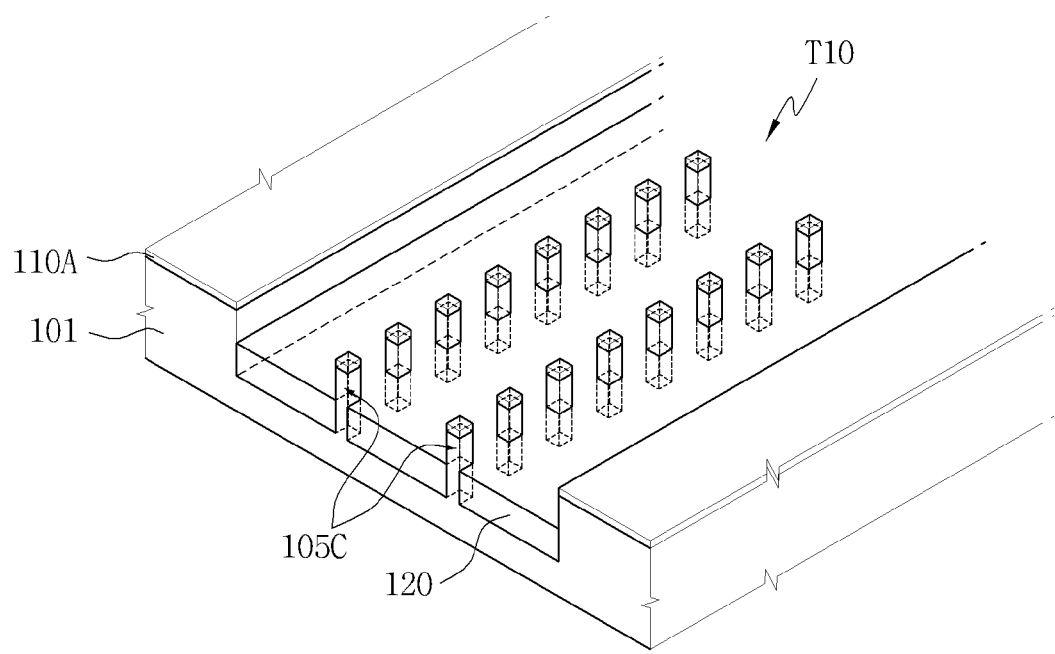

Referring to FIG. 7C, claddings 120 may be formed within the ninth trenches T9. Tenth trenches T10 may be formed on the claddings 120. The island- or pillar-shaped protrusions 105C may be exposed on the claddings 120, or within the tenth trenches T10. Although the pad element pattern 110A may be removed, FIG. 7C illustrates that the pad element pattern 110A is not removed to demonstrate that the example embodiments may be variously applied and embodied. In FIG. 7C, dotted lines denote outer lines or interfaces.

Figure 7D:
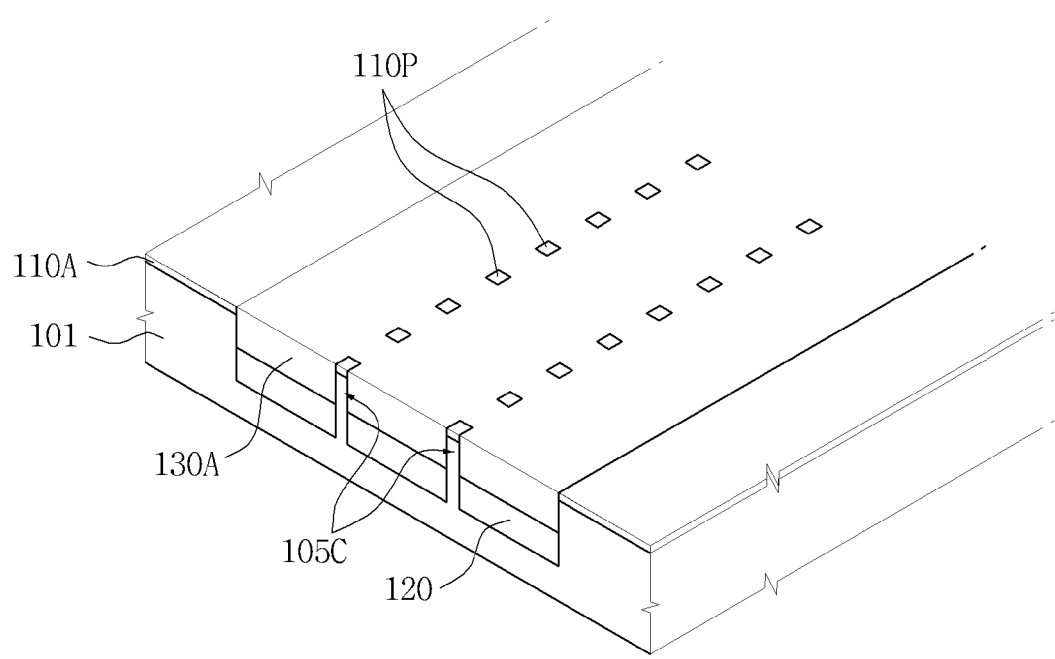

Referring to FIG. 7D, the tenth trenches T10 may be filled with an amorphous material layer 130A, and the amorphous material layer 130A may be planarized. In FIG. 7D, a portion 110P of the pad element pattern 110A may be exposed by planarizing an upper portion of the amorphous material layer 130A. A case where the portion 110P of the pad element pattern 110 is not exposed may be understood with reference to FIG. 3G.

Figure 7E:
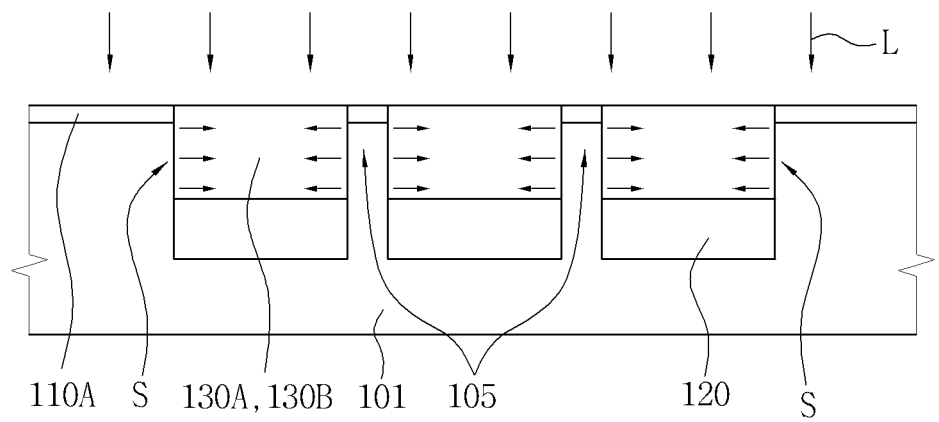

Referring to FIG. 7E, a single crystallization process may be performed using laterals surfaces of the island- or pillar-shaped protrusions 105C and a lateral surface of the substrate 101 as single-crystallization seeds so that the amorphous material layer 130A can be changed into a single-crystallization material layer 130B. As a result, a shape shown in FIG. 3H may be obtained.

It will be fully understood that various structures and shapes described herein are not distinct from one another but compatible with one another. Because various processes of forming optical transceivers according to example embodiments are compatible with the process of forming active isolating elements or field oxide regions of semiconductor chips, the processes of forming the optical transceivers may be performed using simple processes. Alternatively, because the processes of forming the optical transceivers according to example embodiments are compatible with various processes using an epitaxial growth technique, for example, a process of forming gate electrodes including planar, FIN-type, or buried channel arrays, a process of forming elevated sources and drains, a process of forming landing pads, and a process of forming single-crystalline charge storage units, the processes of forming the optical transceivers may be performed using simplified processes.

Figure 8:
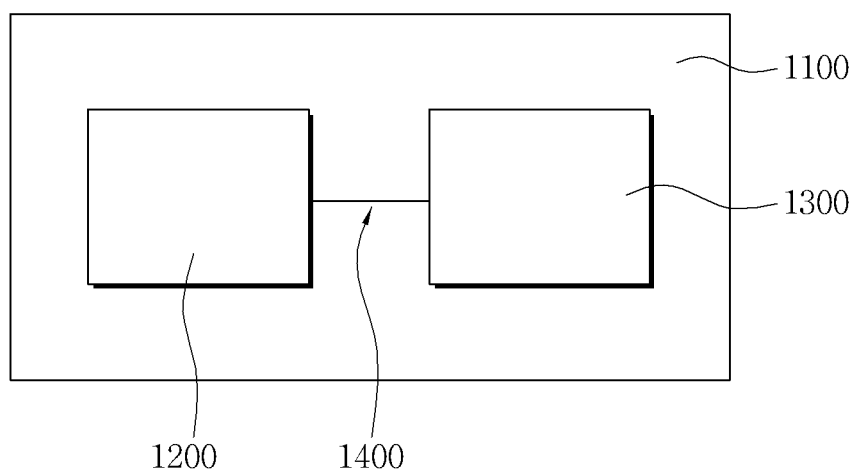

FIG. 8 is a conceptual block diagram of a semiconductor device according to example embodiments.

Referring to FIG. 8, a semiconductor device 1000 may include a cell block 1200 and an optical integrated-circuit (IC) block 1300 disposed on a device substrate 1100. The cell block 1200 and the optical IC block 1300 may be electrically connected by an interconnection 1400. The semiconductor device 1000 may include a memory device or a logic device. The memory device may include a dynamic random access memory (DRAM), a static RAM (SRAM), a flash memory, a phase-change random access memory (PRAM), a magnetic RAM (MRAM), or a resistive RAM (RRAM). The device substrate 1100 may include a silicon wafer. The cell block 1200 may include a plurality of memory cells or a plurality of transistors. The optical IC block 1300 may include one of various optical transceivers described in the present specification. The interconnection 1400 may electrically or optically transmit signals. The optical IC block 1300 may optically or electrically communicate with another external electronic device, module, or system using an optical transceiver.

Figure 9:
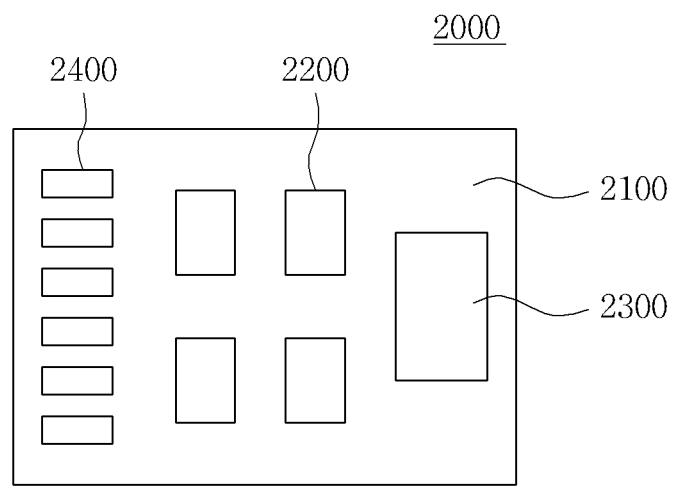

FIG. 9 is a block diagram of a semiconductor module according to example embodiments.

Referring to FIG. 9, a semiconductor module 2000 may include a module substrate 2100, a plurality of semiconductor devices 2200, a control device 2300, and a plurality of input/output (I/O) units 2400. Each of the semiconductor devices 2200 may include a memory device. The memory device may include one of the semiconductor devices described with reference to FIG. 8. The control device 2300 may include a logic device (e.g., a microprocessor (MP)). Each of the I/O units 2400 may include a semiconductor chip or conductive terminal. The semiconductor devices 2200, the control device 2300, and the I/O units 2400 may be electrically or optically connected to one another. Any one of the semiconductor devices 2200, the control device 2300, and the I/O units 2400 may include an optical transceiver described in the present specification.

Figure 10:
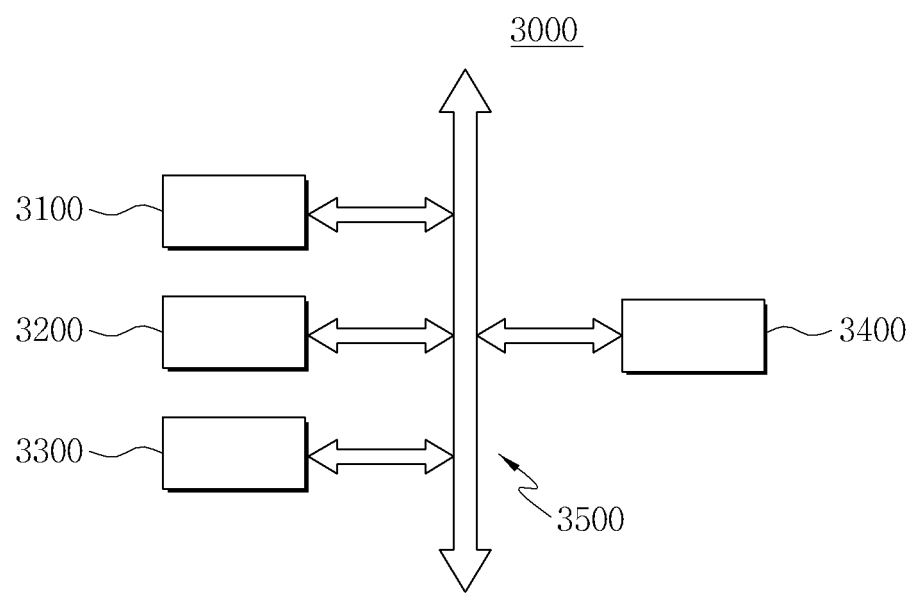

FIG. 10 is a block diagram of an electronic system according to example embodiments.

Referring to FIG. 10, an electronic system 3000 may include an interface 3100, a controller 3200, a memory 3300, and an external I/O device 3400. The interface 3100 may be electrically or optically connected to the controller 3200, the memory 3300, and the external I/O device 3400 through a bus 3500.

The electronic system 3000 may include a personal digital assistant (PDA), a portable computer (PC), a web tablet, a wireless phone, a mobile phone, and a digital music player. The interface 3100 may communicate data with an external system. That is, the interface 3100 may transmit/receive data to/from a communication network. The interface 3100 may include the optical transceiver 100A, 100B, 100C, or 100D of FIG. 2A through 2D, the semiconductor device 1000 in FIG. 8, or the semiconductor module 2000 in FIG. 9 according to the example embodiments. The interface 3100 may communicate data with an external system using optical signals. Thus, the interface 3100 may transmit signals at a higher transmission rate in a more stable manner than in the conventional devices. The controller 3200 may include a logic device (e.g., an MP), a logic package, or a logic module. The external I/O device 3400 may be a keypad, a keyboard, a touch screen, and/or a display device.

The memory 3300 may temporarily or permanently store data processed by the controller 3200. The memory 3300 may be electrically or optically connected to the interface 3100. In this case, the memory 4300 may include an optical transceiver according to example embodiments.

The electronic system 3000 may optically transmit and receive data to and from an external system by the interface 3100 including the optical transceiver 100A, 100B, 100C, or 100D of FIGS. 2A through 2D, the semiconductor device 1000, and/or the semiconductor module 2000 according to example embodiments. Thus, the electronic system 3000 may transmit and receive data more stably and rapidly.

Example embodiments provide a coupler (i.e., single-crystallized silicon layer) having a desired (or wide) plane area by forming a plurality of single-crystallization seeds at intervals of about 20 μm or less.

Because a semiconductor device according to example embodiments has a relatively wide coupler, optical transceiving rate and efficiency can be improved.

Because a semiconductor device according to example embodiments has good performance, a high-speed highly integrated electronic device and system can be embodied.

Because a semiconductor device according to example embodiments has a coupler disposed within a groove, the formation of a coupler can be simplified.

In a semiconductor device according to example embodiments, because a coupler can be formed in a simple and stable manner, yield and productivity can be increased.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of the example embodiments as defined in the claims.

What is claimed is:

1. A semiconductor device, comprising:
   a cladding on a substrate;
   a protrusion vertically extending through the cladding and materially in continuity with the substrate, wherein the protrusion is in direct contact with the cladding;
   a coupler configured to collect or emit light on the cladding and the protrusion, wherein the coupler is materially in continuity with the protrusion, and the coupler includes a plurality of gratings; and
   a waveguide configured to horizontally extend from the coupler, wherein the waveguide is materially in continuity with the coupler.

2. The device of claim 1, wherein the substrate and the protrusion include single crystalline silicon (Si).

3. The device of claim 1, wherein the coupler includes single crystalline Si.

4. The device of claim 1, wherein the waveguide has a vertical height equal to a vertical height of the coupler.

5. The device of claim 4, wherein
   a height of the coupler includes a height of the plurality of gratings.

6. The device of claim 1, wherein the coupler is in contact with the protrusion and the waveguide is not in contact with the protrusion.

7. The device of claim 6, wherein the waveguide has a smaller horizontal width than the coupler, and is on the cladding.

8. The device of claim 1, wherein the cladding includes silicon oxide.

9. The device of claim 1, further comprising;
   a plurality of the claddings,
   wherein the coupler is on at least two of the plurality of claddings.

10. The device of claim 1, wherein, the substrate includes a groove, and
    a lower surface of the groove includes an upper surface of the cladding.

11. The device of claim 10, wherein the coupler is within the groove, and a depth of the groove is equal to a vertical height of the coupler.

12. The device of claim 10, wherein a minimum distance between a sidewall of the groove and the protrusion ranges between 10 and 20 µm.

13. The device of claim 1, wherein the cladding has a minimum horizontal width between 10 and 20 µm.

* * * * *